(12) United States Patent
Langenfeld et al.

(10) Patent No.: US 7,454,908 B1
(45) Date of Patent: Nov. 25, 2008

(54) ZERO TURN TRANSAXLE

(75) Inventors: Thomas J. Langenfeld, Sullivan, IL (US); Matthew C. Roney, Sullivan, IL (US); Shane A. Deters, Mattoon, IL (US); Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 11/971,477

(22) Filed: Jan. 9, 2008

Related U.S. Application Data

(63) Continuation of application No. 11/753,813, filed on May 25, 2007, now Pat. No. 7,328,576, which is a continuation of application No. 11/358,811, filed on Feb. 21, 2006, now Pat. No. 7,225,617, which is a continuation of application No. 11/008,444, filed on Dec. 9, 2004, now Pat. No. 7,047,736, which is a continuation of application No. 10/386,233, filed on Mar. 11, 2003, now Pat. No. 6,843,056.

(60) Provisional application No. 60/439,765, filed on Jan. 13, 2003.

(51) Int. Cl.
*F16H 57/02* (2006.01)
*B60K 17/10* (2006.01)
*F16H 39/00* (2006.01)

(52) U.S. Cl. .................................. 60/487; 180/6.48
(58) Field of Classification Search .............. 60/464, 60/484, 485, 486, 487, 488; 180/6.48
See application file for complete search history.

(56) References Cited

U.S. PATENT DOCUMENTS

| | | | |
|---|---|---|---|
| 2,474,706 A | 6/1949 | Wahlmark | |
| 3,279,172 A | 10/1966 | Kudo et al. | |
| 3,362,161 A | 1/1968 | Flint | |
| 3,727,712 A | 4/1973 | Colloton | |
| 4,116,292 A | 9/1978 | Todeschini et al. | |
| 4,132,278 A | 1/1979 | Todeschini | |
| 4,174,013 A | 11/1979 | Yago | |
| 4,461,341 A | 7/1984 | Morrison | |
| 4,574,902 A | 3/1986 | Irimajiri | |
| 5,078,222 A * | 1/1992 | Hauser et al. | 180/6.48 |
| 5,201,692 A | 4/1993 | Johnson et al. | |
| 5,259,194 A | 11/1993 | Okada | |
| 5,528,958 A | 6/1996 | Hauser | |
| 5,555,727 A | 9/1996 | Hauser et al. | |
| 5,590,737 A | 1/1997 | Azuma et al. | |
| 5,622,051 A | 4/1997 | Iida et al. | |

(Continued)

FOREIGN PATENT DOCUMENTS

JP 08-219253 8/1996

(Continued)

*Primary Examiner*—Thomas E Lazo
(74) *Attorney, Agent, or Firm*—Neal Gerber Eisenberg LLP

(57) ABSTRACT

A transaxle including a hydrostatic transmission mounted in a transmission housing and having a pair of hydraulic pumps and hydraulic motors operatively connected together through a center section mounted in the housing. First and second axle housings are mounted on opposite ends of the transmission housing, with output axles mounted in the axle housings and connected to the respective hydraulic motors, and the output axles are offset so that the axes of rotation of the axles do not intersect any portion of the transmission housing.

21 Claims, 23 Drawing Sheets

U.S. PATENT DOCUMENTS

| | | | |
|---|---|---|---|
| 5,918,691 A * | 7/1999 | Ishii | 60/484 |
| 5,957,229 A | 9/1999 | Ishii | |
| RE36,807 E | 8/2000 | Okada | |
| 6,151,990 A | 11/2000 | Johnson et al. | |
| 6,152,247 A | 11/2000 | Sporrer et al. | |
| 6,192,682 B1 | 2/2001 | Smothers et al. | |
| 6,370,876 B1 | 4/2002 | Langenfeld | |
| 6,374,604 B1 | 4/2002 | Poplawski et al. | |
| 6,425,244 B1 | 7/2002 | Ohashi et al. | |
| 6,487,857 B1 | 12/2002 | Poplawski et al. | |
| 6,526,749 B1 | 3/2003 | Hauser et al. | |
| 6,530,200 B1 | 3/2003 | Minoura et al. | |
| 6,550,243 B2 | 4/2003 | Hauser et al. | |
| 6,578,656 B2 | 6/2003 | Samejima et al. | |
| 6,644,425 B1 * | 11/2003 | Hauser | 180/6.48 |
| 6,672,843 B1 | 1/2004 | Holder et al. | |
| 6,688,091 B2 | 2/2004 | Ishimori | |
| 6,708,805 B2 | 3/2004 | Samejima et al. | |
| 6,739,128 B2 | 5/2004 | Boyer et al. | |
| 6,755,019 B1 | 6/2004 | Phanco | |
| 6,758,290 B2 * | 7/2004 | Jolliff et al. | 180/6.48 |
| 6,779,615 B2 * | 8/2004 | Boyer et al. | 180/6.48 |
| 6,820,403 B2 * | 11/2004 | Umemoto | 180/291 |

FOREIGN PATENT DOCUMENTS

| | | |
|---|---|---|
| JP | 2000-009023 | 1/2000 |
| JP | 2000-071790 | 3/2000 |

* cited by examiner

ZERO TURN TRANSAXLE

CROSS REFERENCE TO RELATED APPLICATIONS

This application is a continuation of U.S. patent application Ser. No. 11/753,813 filed May 25, 2007; which is a continuation of U.S. patent application Ser. No. 11/358,811 filed on Feb. 21, 2006; which is a continuation of U.S. patent application Ser. No. 11/008,444 filed on Dec. 9, 2004 and now U.S. Pat. No. 7,047,736, which is a continuation of U.S. patent application Ser. No. 10/386,233, filed Mar. 11, 2003 and now U.S. Pat. No. 6,843,056, which claims the benefit of U.S. Provisional Application Ser. No. 60/439,765, filed Jan. 13, 2003. These prior applications are incorporated herein in their entirety by reference.

BACKGROUND OF THE INVENTION

This invention relates to hydrostatic transmissions in general and in particular to such transmissions used in applications known as zero turn ("ZT") vehicles, where the transmission has two independent outputs that can drive the vehicle wheels in opposite directions.

One known ZT design incorporates two separate hydrostatic transmissions and two separate gear and axle housings; with each transmission bolted to a separate housing. A design of this type is shown in U.S. Pat. No. 5,078,222. While such designs offer flexibility, the use of two separate HSTs increases the costs and complexity of the unit.

Other known designs incorporate the hydrostatic transmission and the two output axles into a single housing. Such designs lack the necessary flexibility required to adapt the transaxle unit to a variety of vehicle applications.

SUMMARY OF THE INVENTION

The present invention teaches a zero turn transaxle that solves the aforementioned problems by presenting a low cost yet flexible design. The preferred embodiment of this design uses a transmission housing in which a pair of hydraulic pumps and a pair of hydraulic motors are mounted on a porting block, in which the hydraulic porting to connect the respective pumps and motors is formed. The transmission includes a pair of motor output shafts engaged to and driven by the respective motors; these output shafts extend outside the transmission housing.

A pair of separate axle housings are mounted on opposite sides of the transmission housing and include various gears and output axles. The use of the separate axle housings permits the user a wide degree of flexibility in how the unit is assembled, so that it may fit into different types of ZT vehicles and may be used for a variety of industrial applications. Such flexibility includes the ability to orient the axle drive units in various positions with respect to the transmission, including having orientations of the axle drive units that would permit the axle shafts to be non-coaxial. The transmission housing is configured so that with a particular orientation of the axle drive units the transmission may be positioned such that the input shaft may be on the right or left side of the transaxle centerline. Variations in vehicle frame width may be accommodated by either moving the location of the mounting interface on the axle drive unit housings, or replacing the housing with the axle horn with one that has a different axle horn length, while leaving all other components identical to the basic configuration.

Other benefits and objects of this invention are disclosed herein and will be obvious to readers of ordinary skill in the art. The features disclosed herein can be combined to create a unique hydrostatic transmission design; it is understood, however, that such features are unique in their own right and can be used independently with other transmission designs, as will be obvious to one of ordinary skill in the art.

DETAILED DESCRIPTION OF THE DRAWINGS

Figure 9:
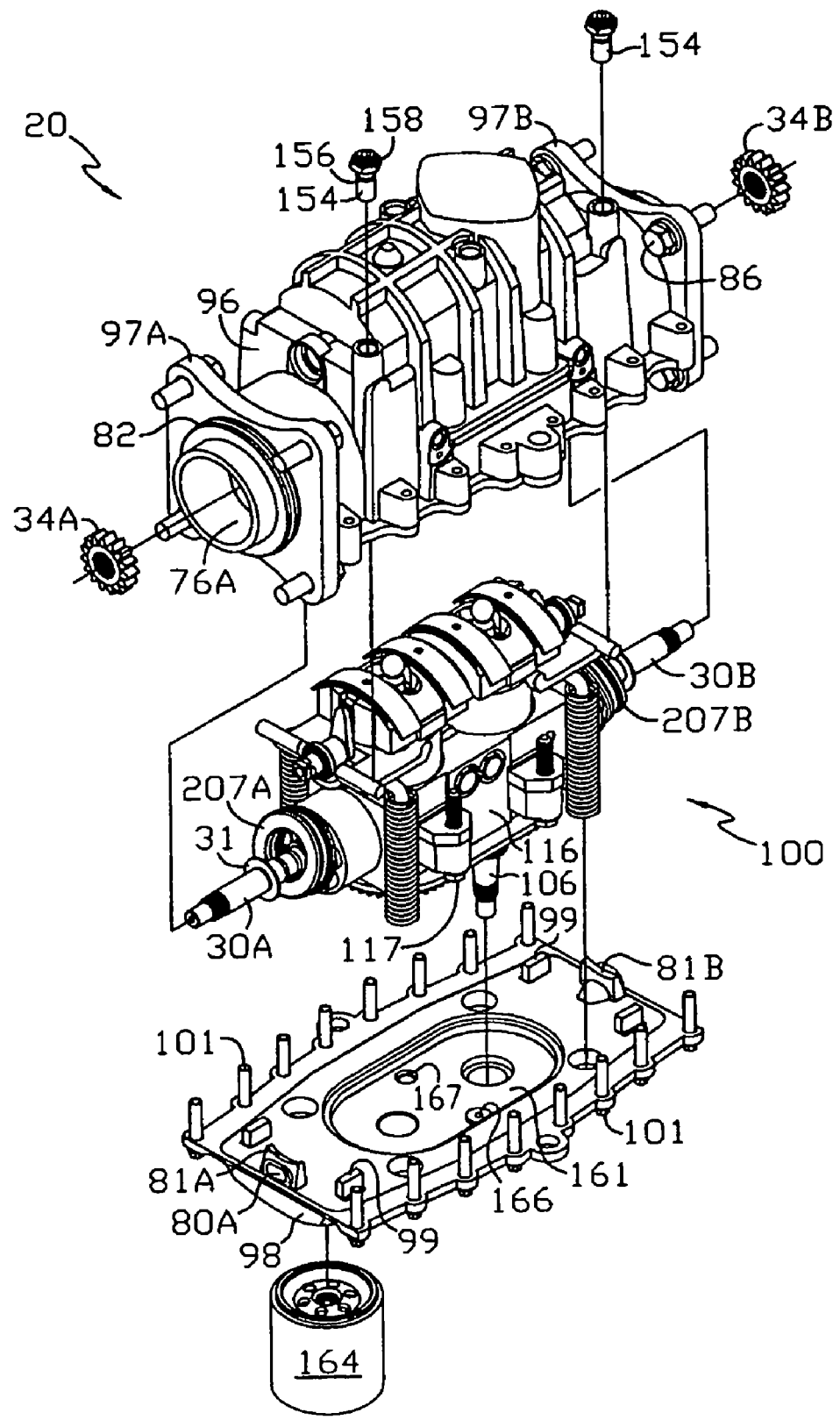
FIG. 9 is an exploded perspective view of the transmission portion of one embodiment of the present invention, with certain elements removed for clarity.

The figures depict a transaxle drive system 10 having a hydrostatic transmission 20 and two separate axle drive units 22 and 24 secured together to provide a zero turn transaxle. Hydrostatic transmission 20 comprises hydraulic assembly 100 mounted in housing 96 closed by cover 98, as shown, e.g., in FIG. 9. Axle drive units 22 and 24 are substantially identical in construction. Throughout the following discussion, identical elements may be referred to either with the same identical number or, where appropriate for ease of explanation, may have a suffix "A" or "B" added to denote one side or the other of the transaxle drive system center line.

In the embodiment depicted, axle drive units 22 and 24 are substantially identical in construction. By way of example, axle drive unit 22 is comprised of a two piece housing comprising inner housing 28A and outer housing 26A having an axle horn 27A formed thereon; it will be understood that axle horn 27A could also be formed as a separate piece and bolted or otherwise secured to outer housing 26A. Inner housing 28A is secured to outer housing 26A through a plurality of bolts 29 to form a sump 78A for hydraulic fluid or oil. Axle 46A is mounted in and supported by inner housing 28A and outer housing 26A.

Motor shaft 30A extends through inner housing 28A through passage 76A and is supported at one end by bearing 32A, which can be pressed into housing 26A. The other end of motor shaft 30A extends into and is supported by a bearing 33 in center section 116. Motor shaft 30A is prevented from moving into the center section 116 by the combination of a washer and retaining ring 31 in contact with a boss formed as part of housing 96. In the embodiment shown, oil is permitted to flow between axle drive unit 22 and transmission 20 through passage 76A. Retainers 81A and 81B are formed as part of cover 98, or they could be otherwise secured thereto, and act as retainers for motor thrust bearings 207A and 207B. With regard to retainer 81A, again with the understanding that retainer 81B is preferably identical, an inlet 80A is formed therein and provides passage of oil from passage 76A to filter 164 and the charge pump. It will be understood that a seal could also be located at this junction to prevent oil from passing between the transmission 20 and axle drive units 22 and 24. Such a configuration would allow separate lubrication of the gear components, possibly with a different weight oil or a grease. The inlet to the oil filter or charge pump would then be from the transmission housing or from a reservoir forming a separate pump.

Again with reference to axle drive unit 22, one can see that pinion 34A is mounted on motor shaft 30A and is engaged to and drives first reduction gear 36A. A second reduction gear 38A is mounted on reduction gear counter shaft 40A and is driven by internal gear teeth of gear 36A, a configuration known in the art and shown, for example, in U.S. Pat. No. 5,555,727. In the preferred embodiment, second reduction gear 38A has an identical gear form to that of pinion 34A, but is simply formed with a different thickness. Counter shaft 40A is supported in part by bearings 42A so that it is free to rotate. Reduction gear 38A in turn drives final drive gear 44A which is engaged to and drives axle 46A. In the preferred embodiment, final drive gear 44A has an identical gear form to that of the first reduction gear 36A. It will be understood that the construction of axle drive unit 24 will preferably be identical.

Figure 6:
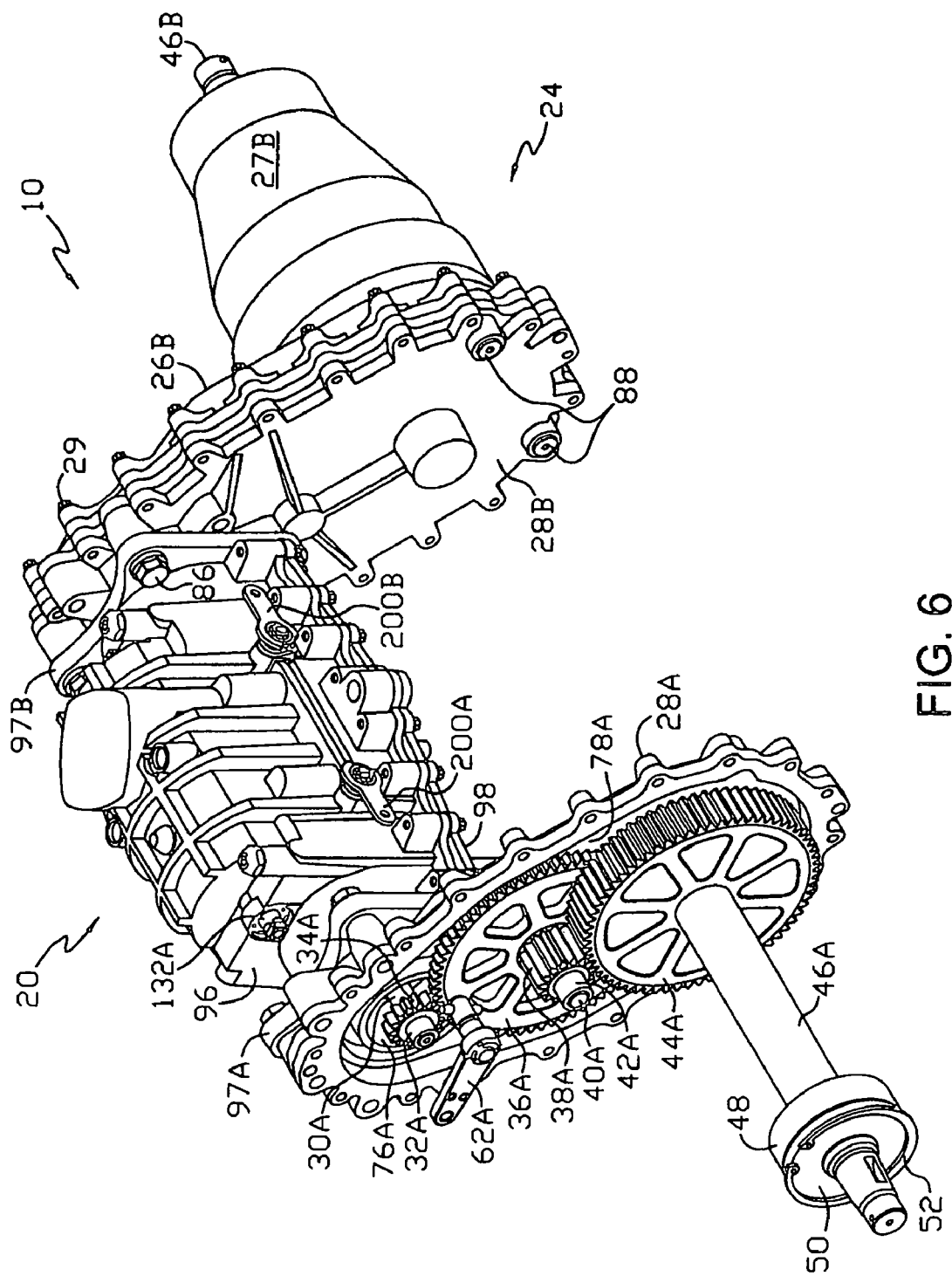
FIG. 6 is a perspective view similar to FIG. 1, but with one portion of one of the axle housings removed to show the gears and axle mounted inside that axle drive unit.
Figure 8:
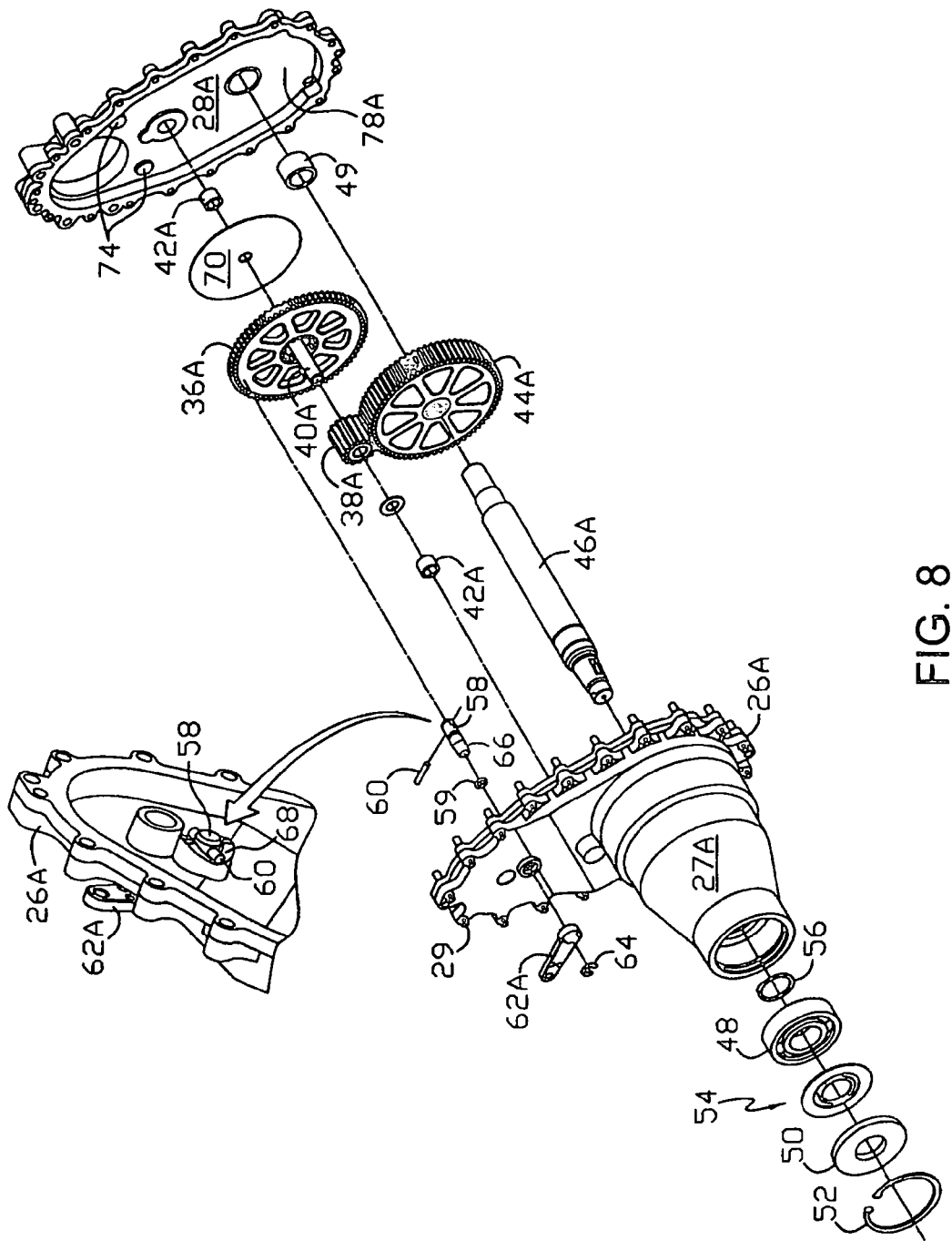
FIG. 8 is an exploded perspective view of one of the axle drive units and the gears and axle located therein.

As shown in FIGS. 6 and 8, axle 46A is supported by axle shaft bearings 48 and 49. Bearings 48 and 49 are preferably located in housings 26A and 28A, providing optimal support for axle shaft 46A. Keeping these bearing thus separated also permits keeping the interior of axle housing 28A free of ribs and other support structure such that the interior of axle horn 27A may provide a large sump volume. This relatively quiescent volume provides a location for air entrained in the oil to separate as well as some contaminants. It is also possible to include a magnet in this area to attract and retain ferrous particulates. In an orientation where the axle drive units 22 and 24 are oriented such that the shafts 46A and 46B are higher than transmission 20, such as may occur in some anticipated industrial applications, this volume may serve as the expansion tank for the transaxle drive system 10. Seal 50 and retaining ring 52 are used with outboard axle shaft bearing 48. Washer and retaining ring set 54 could also be used between seal 50 and bearing 48 if desired. Retaining ring 56 further aids in establishing and maintaining the position of bearing 48 on axle 46A.

Figure 4:
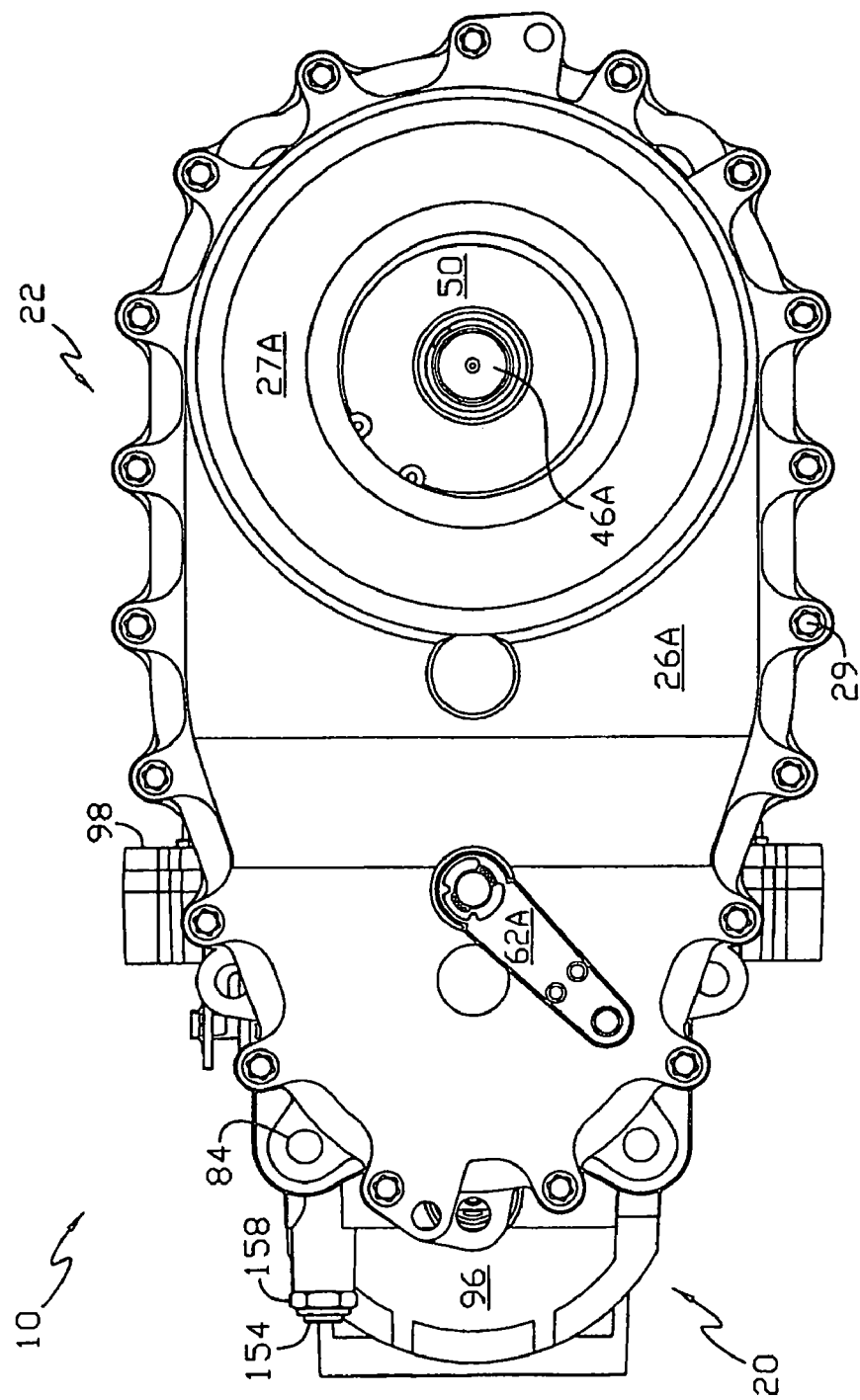
FIG. 4 is an end view of an alternative embodiment of the transaxle shown in FIG. 1, where the axle housings are mounted to the transmission housing in a different orientation than is shown in FIG. 1.

As may be noted from FIGS. 1-7, the two axles 46A and 46B may be mounted so that they are colinear; however, the use of three separate housing units permits housings 28A and 28B to be mounted to transmission housing 96 in different arrangements such as shown in FIG. 4. It would also be possible to mount the units so that axles 46A and 46B would not be colinear.

Figure 7:
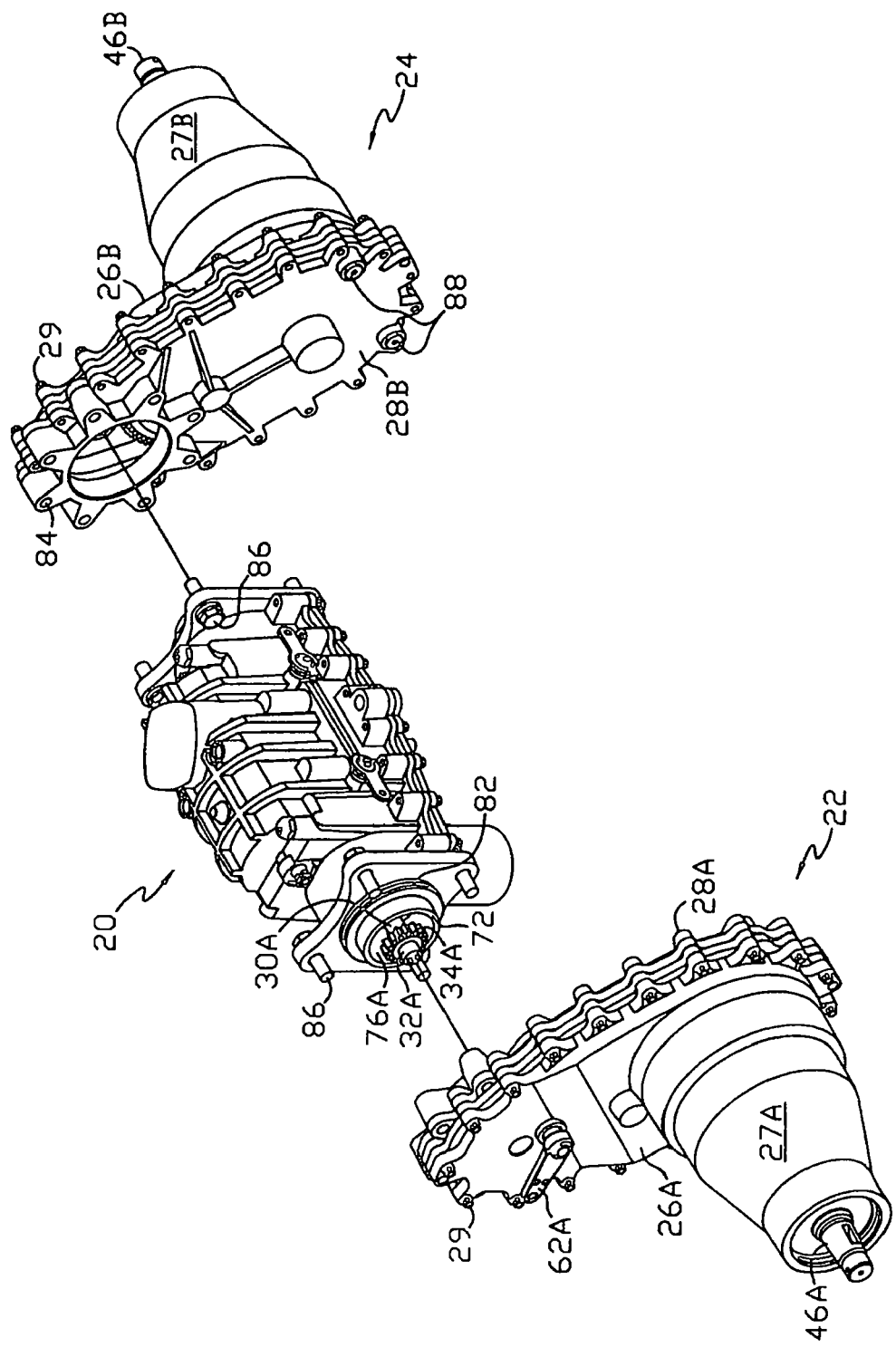
FIG. 7 is a perspective view similar to FIG. 1, with the two axle drive units exploded from the transmission housing to show the connections thereto.

Specifically, transmission housing 96 has mounting flanges 97A and 97B at opposite ends thereof. Inner housings 28A and 28B are mounted to flanges 97A and 97B, respectively, using bolts 86. As can be seen in FIG. 7, by way of example, inner housings 28A and 28B have multiple openings 84. The arrangement of flanges 97A and 97B permits multiple independent orientations of axle drive units 22 and 24 with respect to transmission 20, improving the flexibility of usage in vehicle and industrial applications. The interface between transmission 20 and each axle drive unit 22 and 24 is sealed by an o-ring and groove arrangement 82, which may also be a gasket, liquid sealant or other configurations known in the art.

This invention also contemplates use of a braking device on both axle drive units 22 and 24. As shown most clearly in FIGS. 6-8, again with reference to axle drive unit 22, one can see actuator 58 extending out of outer housing 26A and having brake handle 62A secured thereto and retained on brake actuator 58 by means of retainer 64. An interface 66, which may be a variety of interfaces such as a serration or spline, is formed on the external end of actuator 58 to enable handle 62A to be non-rotatably connected thereto. Handle 62A may be connected to various linkage mechanisms (not shown). This brake is generally intended for use as a parking brake, although it is possible that some dynamic braking could be attained using this system. An o-ring 59 may be used to prevent oil leakage where brake actuator 58 extends through housing 26A. A cam surface 68 is cast into housing 26A and pin 60 is pressed into actuator 58. One can see that the interaction of pin 60 against cam surface 68 will cause actuator 58 to move axially towards first reduction gear 36A to provide braking. The resulting axial thrust of reduction gear 36A is absorbed by thrust surface 72 formed on housing 96 through washer 70. Additional thrust surfaces 74 may be added if needed.

Case drain plugs 88 may also be formed on the inner housings 28 to permit the user to drain the oil from the system.

The use of two drain plugs 88 as shown permits the axle drive units 22 or 24 to be secured to transmission housing 96 in different arrangements while still permitting one of the drain plugs 88 to be located near the bottom of the unit. In applications where the axle drive units 22 and 24 are oriented higher than the transmission 20, the oil filter 164 may be removed to allow oil to drain from the transaxle drive system 10. In a configuration where the transmission 20 is sealed from axle units 22 and 24, the transaxle drive system 10 may be removed from an installed position to allow use of the existing drain plugs 88, or additional drain plugs may be added to allow for removal of oil.

Hydrostatic transmission 20 is comprised of a separate housing 96 which is closed by cover 98 by means of a plurality of bolts 101. Cover 98 is secured to housing 96 and sealed by a liquid sealant or adhesive, but a gasket, o-ring, or other sealing means could also be used. Alignment bosses 99 and retainers 81A and 81B assist in locating cover 98 on housing 96. An oil filter 164 may be secured to cover 98 to provide filtering of the hydraulic oil. As shown most clearly in FIGS. 2 and 21, cover 98 includes fluid passages 159A, 159B and 162 to allow oil to move from various locations in transmission drive system 10 to oil filter 164, then to charge cavity 161 and ultimately the charge gallery 178.

Cover 98 also serves to support one end of input pump shaft 106 and secondary pump shaft 107 by means of bearings 108. The opening in cover 98 through which input pump shaft 106 protrudes provides a location for seal 112, which may use a retaining ring 114 to aid in maintaining seal 112 in position. Washers 168 and 170 are located in the same area as seal 112. These washers are provided adjacent to input shaft splines 171 to aid in keeping shaft 106 retained within transmission 20. Washer 168 is preferably of hardened steel, and washer 170 should be configured to promote movement of washer 168 should the two come into contact.

Holes 324 and 326 in cover 98 are used as one connection location for interfacing transaxle drive system 10 to a vehicle. Holes 149 are for locating one end of springs 146 that are part of the internal return-to-neutral mechanism.

As shown most clearly in FIGS. 10-15 and 21 the hydrostatic components 100 of this invention include a pair of hydraulic pump cylinder blocks 118A and 118B having axial pistons 120 mounted therein. Both of the pump cylinder blocks 118A and 118B are mounted on one side of center section 116. Each of these pump cylinder blocks 118A and 118B may include a block biasing means 122 that consists of a spring and washer in this configuration. The block biasing means 122 is used to maintain proper contact between the pump cylinder blocks 118A and 118B during the variety of pressure conditions that may occur throughout the range of operation and might otherwise tend to lift the block from running surfaces 238 and 240.

Figure 18:
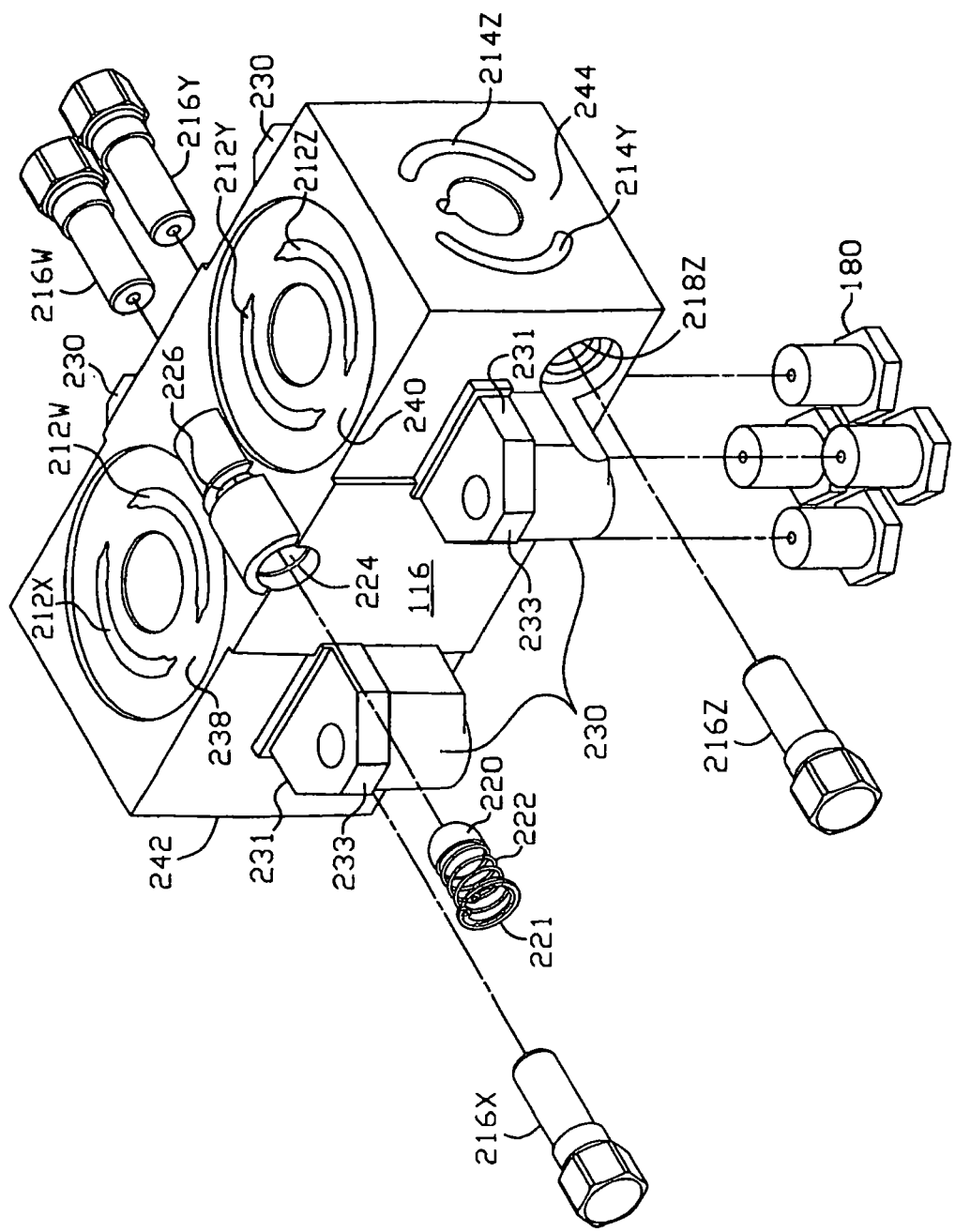
FIG. 18 is an exploded perspective view of the center section of the present invention and certain of the hydraulic components thereof.
Figure 20:
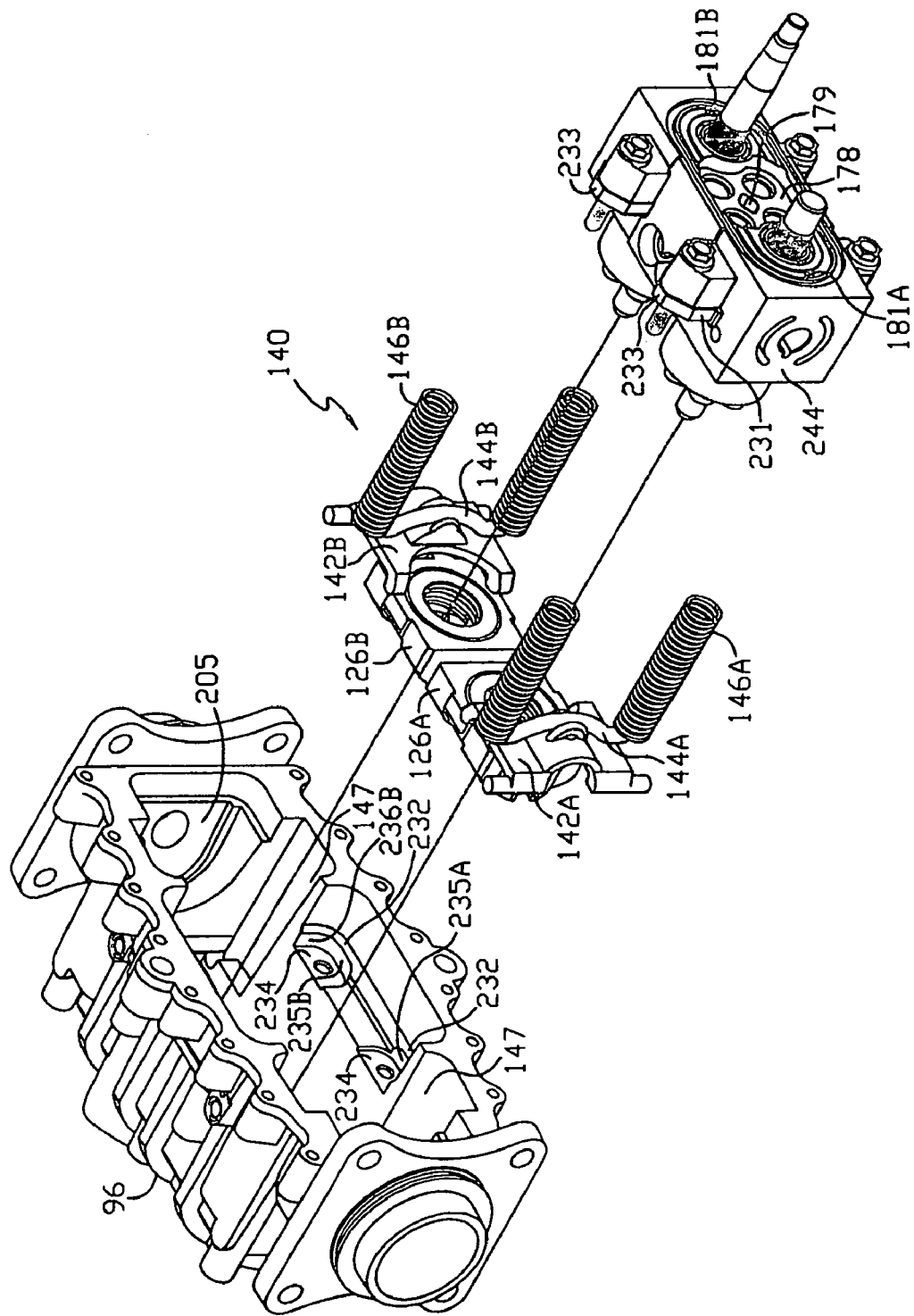
FIG. 20 is an exploded perspective view of portions of the transmission.

As shown in FIG. 18, center section 116 is a generally rectangular block having two pump running surfaces 238 and 240 on one side thereof and corresponding motor running surfaces 242 and 244 formed on opposite ends thereof. In the preferred design, center section 116 is made of cast iron; if other materials such as aluminum are used the center section 116 may need to be sized according to the anticipated pressures. As shown in e.g., FIGS. 16, 18 and 20, center section 116 includes a plurality of mounting bosses 230 to secure center section 116 to housing 96 by means of bolts 117. During assembly, sides 231 and 233 of bosses 230 are guided by ramped sides 232 of housing 96. Ramped sides 232 lead to vertical sides 235A, 235B, 236A and 236B located on both sides of housing 96. As the center section 116 is installed into housing 96, sides 231 and 233 are guided by ramped sides 232 into a position constrained by vertical sides 235A, 235B, 236A and 236B. The center section bolts 117 are then tightened until the bottoms of bosses 230 are in contact with surfaces 234 in housing 96, properly locating and fastening center section 116 in housing 96 for operation.

Figure 19:
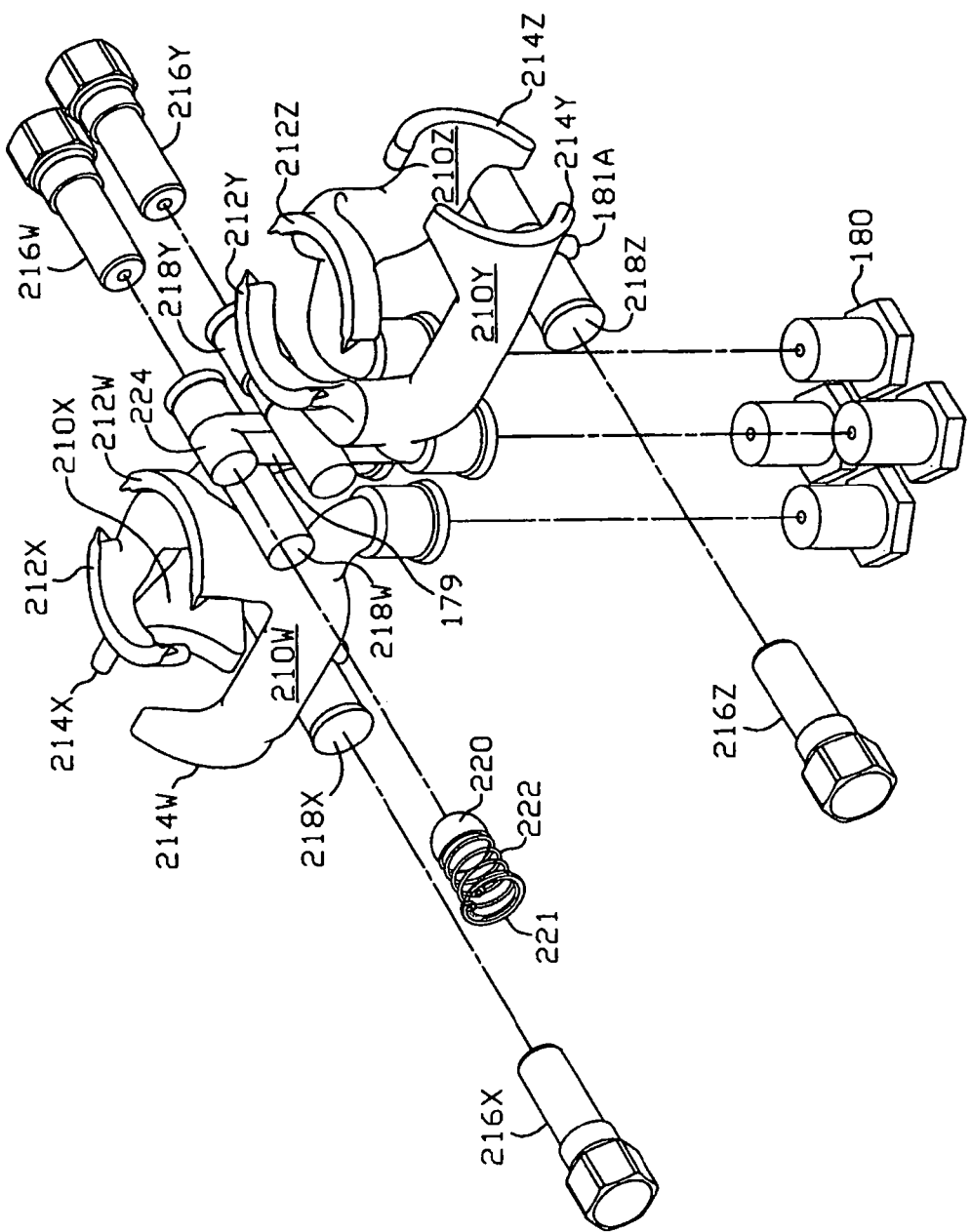
FIG. 19 is a representational drawing showing the internal porting of the center section shown in FIG. 18, along with some of the hydrostatic components.

Center section 116 includes porting integrally formed therein. FIG. 19 shows a representational view of such porting 210W-Z. In order to clearly show these features, elements such as porting 210, kidneys 212 and 214, ports 218 and the like are shown in solid, with the body of center section 116 removed for clarity. Pump running surface 238 includes a pair of kidneys 212W and 212X, which are connected to motor kidneys 214W and 214X through porting 210W and 210X, respectively. Similarly, pump running surface 240 has a pair of kidneys 212Y and 212Z which are connected to motor kidneys 214Y and 214Z through porting 210Y and 210Z, respectively.

One feature of this invention is the symmetry of the kidney and porting design. As shown in FIG. 19, the kidneys 212, 214 and system porting 210 are mirror images of one another. Because the two pump cylinder blocks 118 turn in opposite directions, such mirrored symmetry improves the efficiencies of operation in, for example, the forward direction as the efficiency of each pump and motor will be better matched as the fluid flow paths on each side of center section 116 will be similar. Maintaining similar efficiencies between each pump 118 and motor 206 pair aids in straight tracking of a zero-turn machine, which is steered by the output of the two transaxle drive units 22 and 24.

This design also provides for the use of a plurality of optional valves 216W-Z, which can be shock valves, pressure relief valves, neutral valves or the like depending on the application. Valves 216W-Z can be mounted in corresponding ports 218W-Z formed in center section 116, as shown most clearly in FIG. 18. The machining of ports for the various type of valves may vary, and sufficient material has been provided in center section 116 to accommodate variations in valve port requirements.

Figure 21:
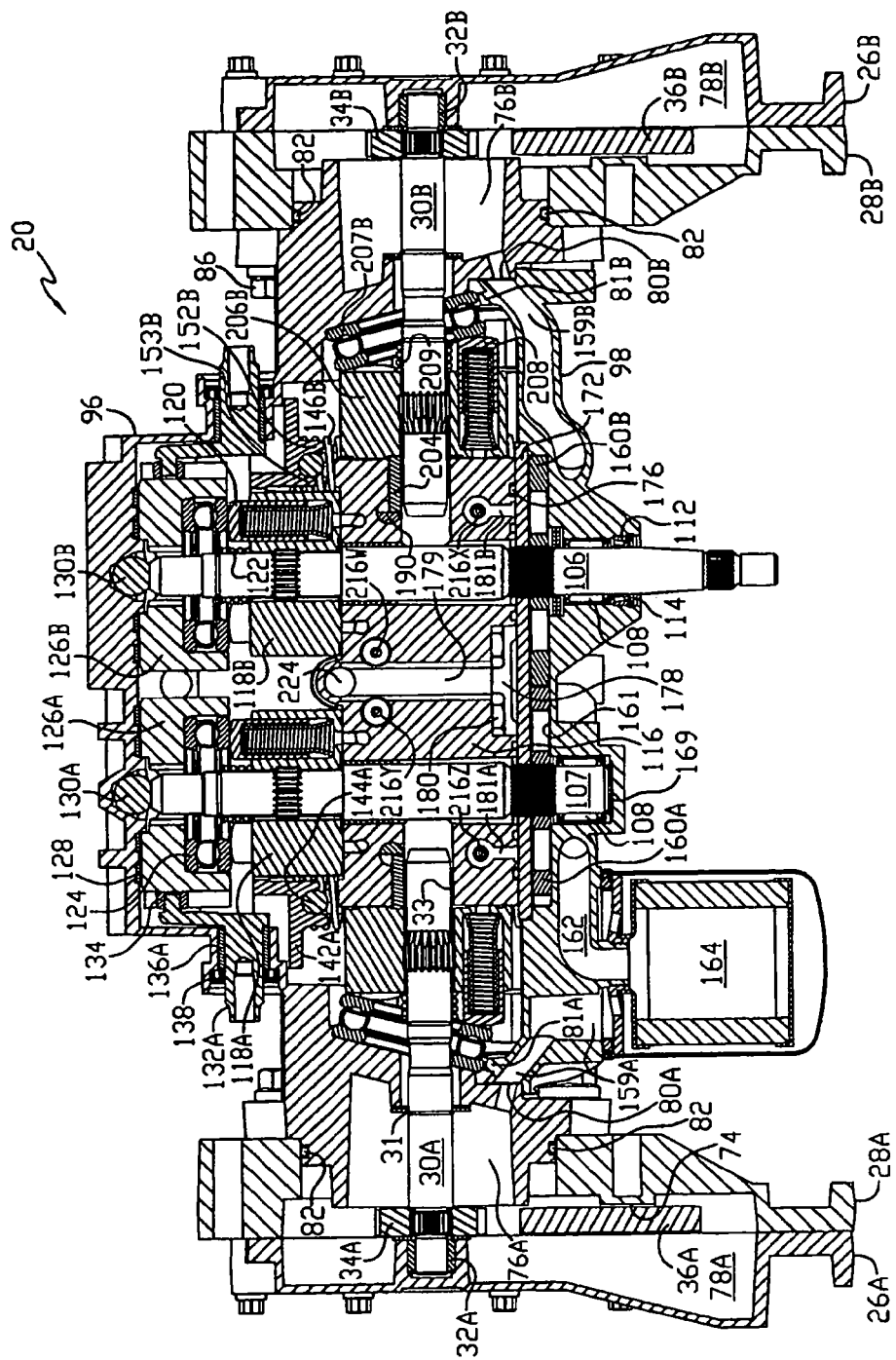
FIG. 21 is a cross-sectional elevational view of the transaxle shown in FIG. 3, along the lines A-A.

One particular valve arrangement is shown in FIGS. 18, 19 and 21, where valves 216W, 216X, 216Y and 216Z are pressure relief valves. In order to function as pressure relief valves, each valve 216 intersects one system port 210. As an example, valve 216Z intersects system port 210Z. Pressure relieved through valve 216Z is returned to the charge gallery 178 by way of passage 181A.

Central passage 179 is formed of a circular cross section with two opposite lobed portions extending outwardly therefrom. These cast features intersect ports 218W and 218Y, which contain pressure relief valves 216W and 216Y. Pressure relieved through valves 216W and 216Y enters passage 179, which is directly connected to charge gallery 178. Excess pressure in charge gallery 178 and passage 179 will move charge relief ball 220 against charge relief spring 222, both of which are located in charge relief port 224, allowing fluid to exit through the charge relief outlet 226 into the transmission case. The charge relief spring 222 and ball 220 are secured within charge relief port 224 by retaining ring 221. Note that while the aforementioned passages 179, 181A and 181B are preferably cast to minimize manufacturing cost, they may also be machined into the center section.

Figure 15:
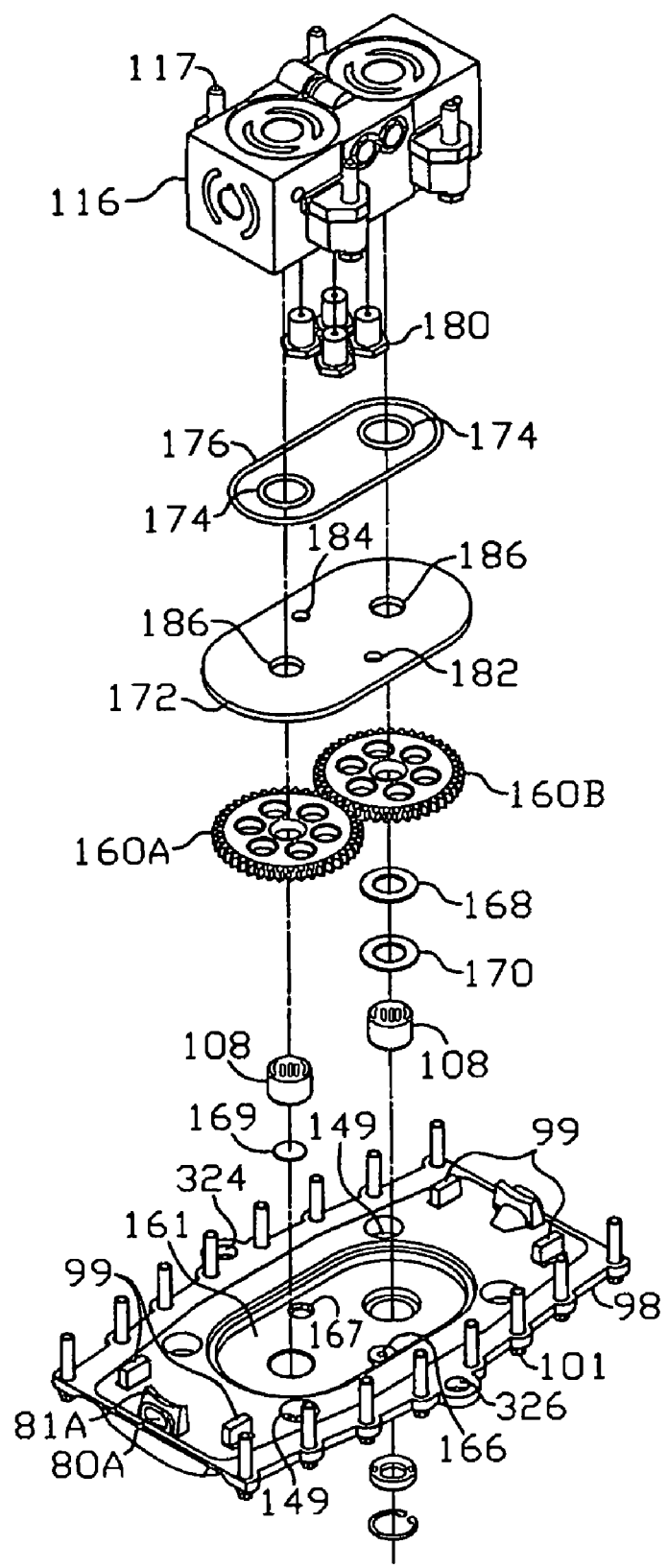
FIG. 15 is an exploded perspective view of the center section, transmission cover, input gearing and related components of the transmission shown in FIGS. 7 and 9.

A further benefit of this design is that gears 160A and 160B, which connect input pump shaft 106 to pump shaft 107, also act as a charge pump for the hydraulic oil, eliminating the need for a separate charge pump to be added. As shown in, e.g., FIG. 15, cover 98 includes cavity 161 formed therein to create a pocket for gears 160A and 160B. Gear pump plate 172 is sized to fit on a step formed about the periphery of cavity 161. A plurality of gaskets 174 and 176 function to compress plate 172 against the step formed at the periphery of cavity 161 as well as providing sufficient fluid containment to form a charge gallery 178 between plate 172 and center section 116. Hole 182 is formed in gear pump plate 172 to permit oil to flow out of cavity 161 by the action of charge pump gears 160A and 160B. As shown in FIG. 15, plate 172 is symmetrically formed with the exception of hole 182, so that it may be oriented as shown, or the plate may be oriented so that hole 182 is in the position marked by phantom hole 184. The symmetry of this plate in conjunction with other features to be described in more detail below allows clockwise or counter clockwise rotation of the input shaft. Plate 172 also includes a pair of openings 186 to permit pump shafts 106 and 107 to pass therethrough. Note that gaskets 174 form a seal about the openings 186 as a part of forming the charge gallery 178.

The charge circuit provides additional hydraulic fluid to the lower pressure sides of system ports 210 when required. This charge circuit is formed by many of the previously described elements, leading to system ports 210.

As shown in, e.g., FIG. 21, hydraulic fluid is pulled through inlets 80A and 80B through passages 159A and 159B into filter 164. From filter 164 the oil is pulled through passage 162 into cavity 161 by gears 160A and 160B. Since transmission 20 may be driven clockwise or counter clockwise, passage 162 is split and may access cavity 161 through either hole 166 or 167. In the embodiment shown, hole 167 is open, will be at vacuum pressure and oil flowing through passage 162 will be drawn into the mesh of gears 160A and 160B therethrough. The other hole 166 in this embodiment is at the pressure side of the gear mesh. In order to prevent the pressure side of gears 160A and 160B from directly communicating with the vacuum pressure side through passage 162, a plug is installed in hole 166. Thus, the pressure created by the gears 160A and 160B flows through hole 182, located in plate 172, into charge gallery 178. Check plugs 180, installed in communication with system ports 210 in center section 116, also communicate with charge gallery 178. When a check plug 180 opens in response to a fluid demand from a particular port 210, the pressurized hydraulic fluid in charge gallery 178 aids the appropriate check plug 180 in opening more quickly and increases the amount of fluid moved therethrough into the appropriate port 210 as compared to a system without a charge pump. In this configuration, charge gallery 178 is formed as a cavity in the center section that also contains the check plugs 180. Pressure above a desired setting travels through passage 179, causing charge relief ball 220 to compress spring 222, allowing hydraulic fluid to flow through opening 226, thus regulating pressure within charge gallery 178.

Figure 5:
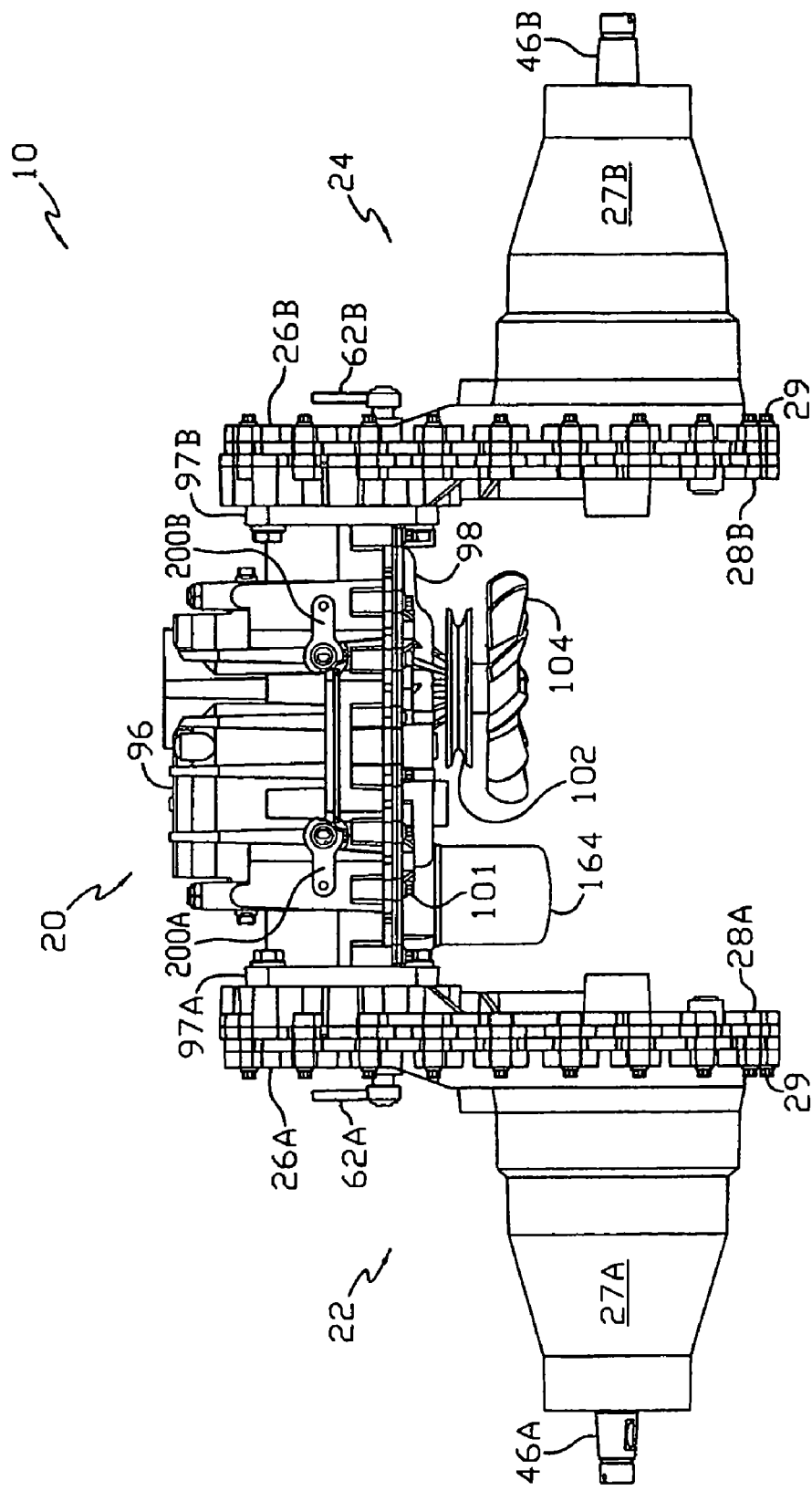
FIG. 5 is a side elevational view of the transaxle shown in FIG. 4.

The general layout and operation of the hydrostatic components 100 is best understood by a review of FIGS. 5, 11, 12 and 21. An input shaft 106 is mounted in and extends through the unit. Threads may be formed on shaft 106 adjacent a first end thereof; as shown in FIG. 5, a pulley 102 may be mounted thereon to drive HST 100. It will be understood that input shaft 106 could be directly driven by a prime mover (not shown). A cooling fan 104 can optionally be located at this end of input shaft 106.

Input shaft 106 acts as a pump shaft to engage and drive cylinder block 118B in a known manner. Input shaft 106 also engages gear 160B, which in turn drives gear 160A. Pump shaft 107 is engaged to and rotated by gear 160A and is also engaged to and drives cylinder block 118A in a known manner.

Figure 16:
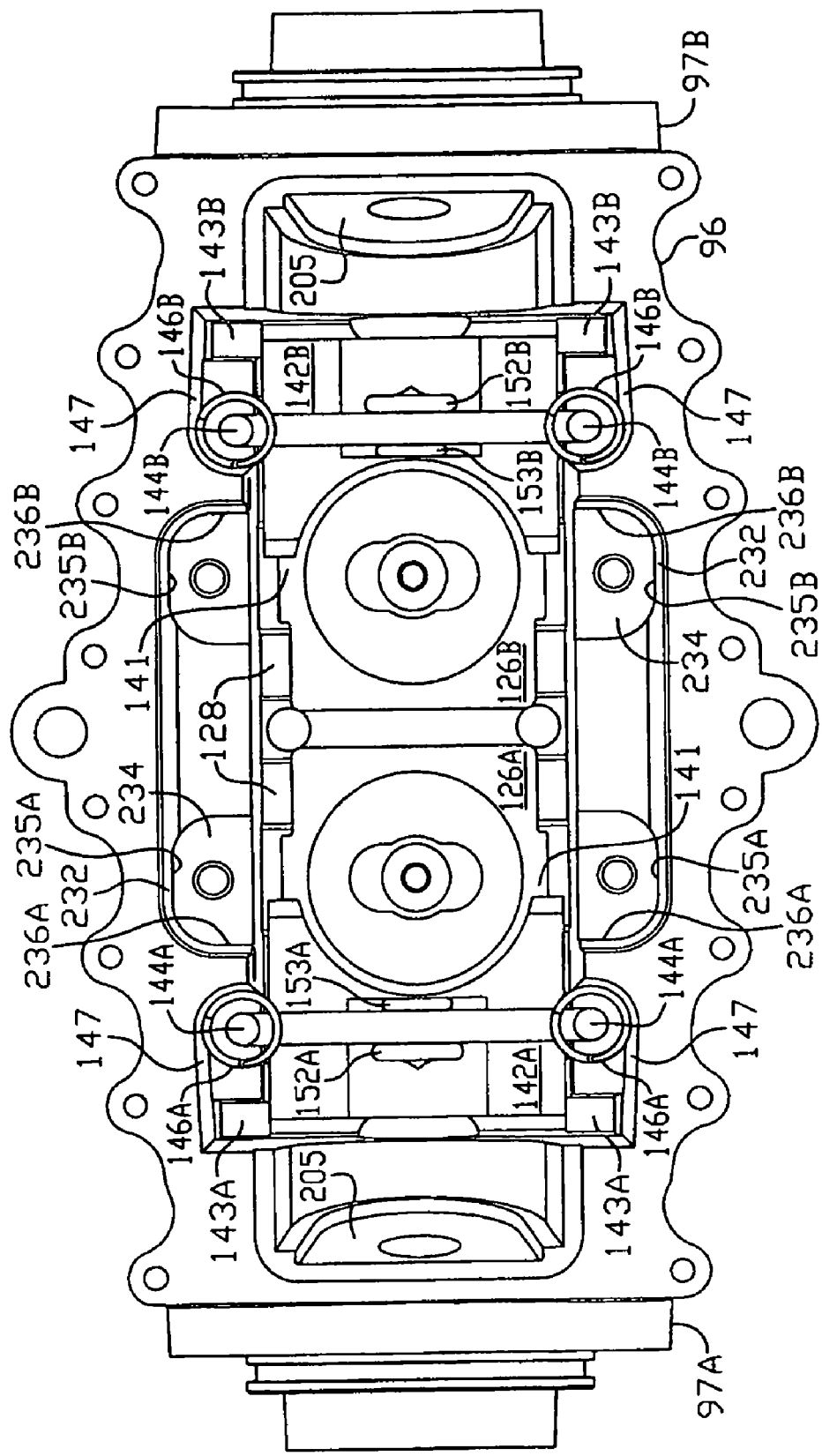
FIG. 16 is a bottom, interior view of the upper portion of the transmission housing shown in FIGS. 7 and 9 with the two pump swash plates, the two return plates and the bias arms for the internal return to neutral feature of the present invention in position.
Figure 17:
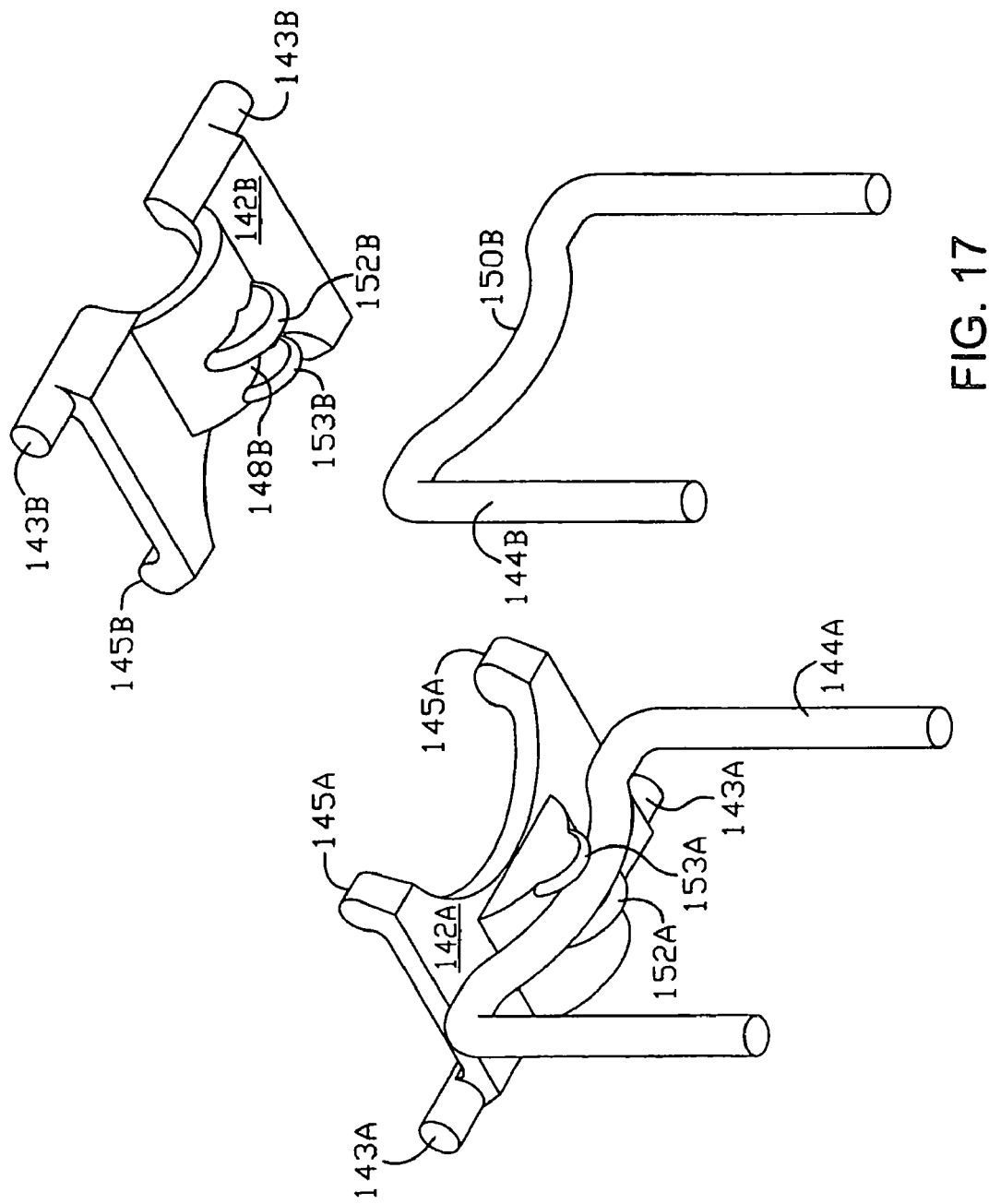
FIG. 17 is a perspective view of the two return plates and bias arms shown in FIG. 16, with one bias arm exploded to expose certain elements of the return to neutral feature of the present invention.

Both pump shafts 106 and 107 are constrained by steel ball bearings 130A and 130B located in corresponding mating features shown in FIGS. 16 and 21 in housing 96 in order to absorb axial thrust loads in that direction from the respective pump shafts 106 and 107. As previously noted, thrust of input pump shaft 106 in the other direction is absorbed by washers 168 and 170. Thrust of shaft 107 in the other direction is absorbed by washer 169.

This design contemplates the use of identical swash plate assemblies for the two pump cylinder blocks 118A and 118B; this discussion will focus on swash plate 126A and its corresponding hardware. Swash plate 126A is preferably of a standard construction and contains a thrust bearing 124 to engage pistons 120. Swash plate 126A is positioned against cradle bearings 128 which are located on an opposite side thereof and which engage housing 96. A trunnion arm 132A is located to one side of swash plate 126A interfacing with slider block 134 and includes a member which extends out of housing 96 supported by bearing 136A and passing through oil seal 138. Rotation of trunnion arm 132A provides corresponding movement of swash plate 126A through contact with slider block 134. Separate trunnion arms 132A and 132B extend out of opposite sides of housing 96 so that they may be attached to the appropriate vehicle linkage representationally shown as linkage 314 in FIG. 22.

Transmission 20 also includes a pair of motor cylinder blocks 206A and 206B; as with the pumps, the discussion will focus on one of the motor assemblies with the understanding that the other assembly will be preferably identical. Motor cylinder block 206A is a standard design, and includes a plurality of pistons 208 (which are preferably identical to pump pistons 120 in the disclosed embodiment, but which may be different sizes) engaged against a fixed swash plate 205. Output motor shaft 30A is engaged to and driven by cylinder block 206A in a standard manner. As shown in FIG. 21, each motor cylinder block 206A and 206B may include a block biasing means 209 that consists of a spring and washer in this configuration. The block biasing means 209 is used to maintain proper contact between the motor cylinder blocks 206A and 206B during the variety of pressure conditions that may occur throughout the range of operation and might otherwise tend to lift the block from running surfaces 242 and 244.

A pair of preferably identical bypass actuators 190 are provided to enable the user to open the hydraulic circuits to put the unit into bypass. With reference to the right side of the relevant figures, bypass arm 200B is secured to actuator 190 by means of retaining ring 202 and extends outside of housing 96. Different methods of rotating actuator 190 could also be used. An O-ring 192 is used to act as a seal for actuator 190, and retaining ring 194 located on bypass actuator 190 is retained by bracket 196 secured to housing 96 by fastener 198 acts to prevent actuator 190 from sliding out of housing 96.

As shown most clearly in FIG. 21, actuator 190 extends into center section 116 and engages a bypass pin 204. A puck or other plate-like structure could also be used in place of pin 204. Rotation of actuator 190 will cause pin 204 to move to engage motor cylinder block 206B to lift block 206B off motor running surface 242, thus opening the hydraulic circuit to the sump and putting the unit into bypass. Operation of actuator 190A on the left side of the figures would be identical. Note that each actuator 190 is perpendicular to the pump and motor shafts, extending out a side of housing 96 away from the input shaft 106, thus allowing an improved ease of connection in comparison to previous block lifting bypass mechanisms. Note also that bearings 33 that support motor shafts 30A and 30B also function to define one portion of the pocket in which each pin 204 resides, thus keeping the pin 204 in position during assembly and protecting the pin 204 from the rotating motor shaft during operation.

Figure 22:
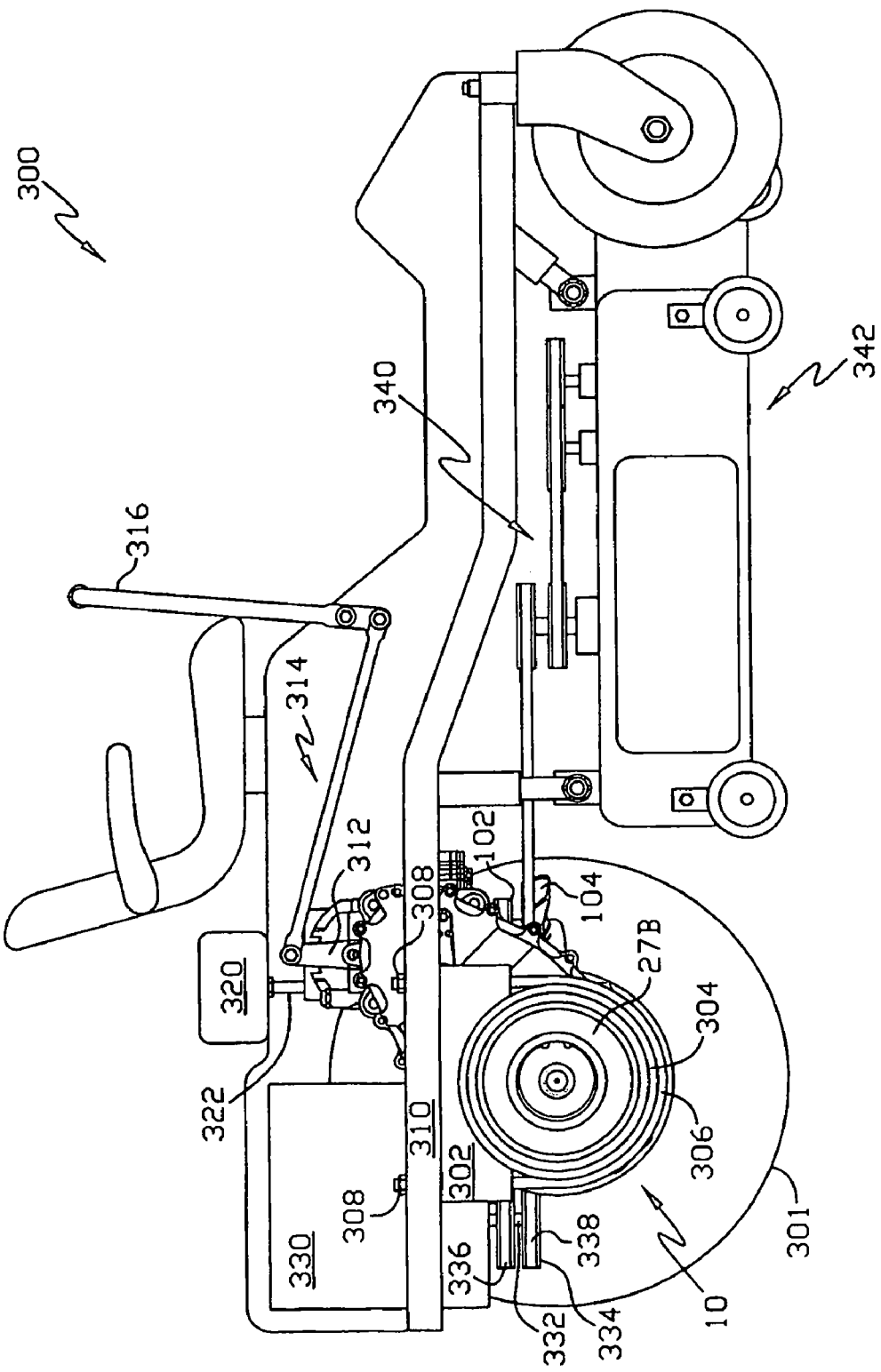
FIG. 22 is side elevational view of a vehicle incorporating a transaxle in accordance with the present invention with one wheel removed.
Figure 23:
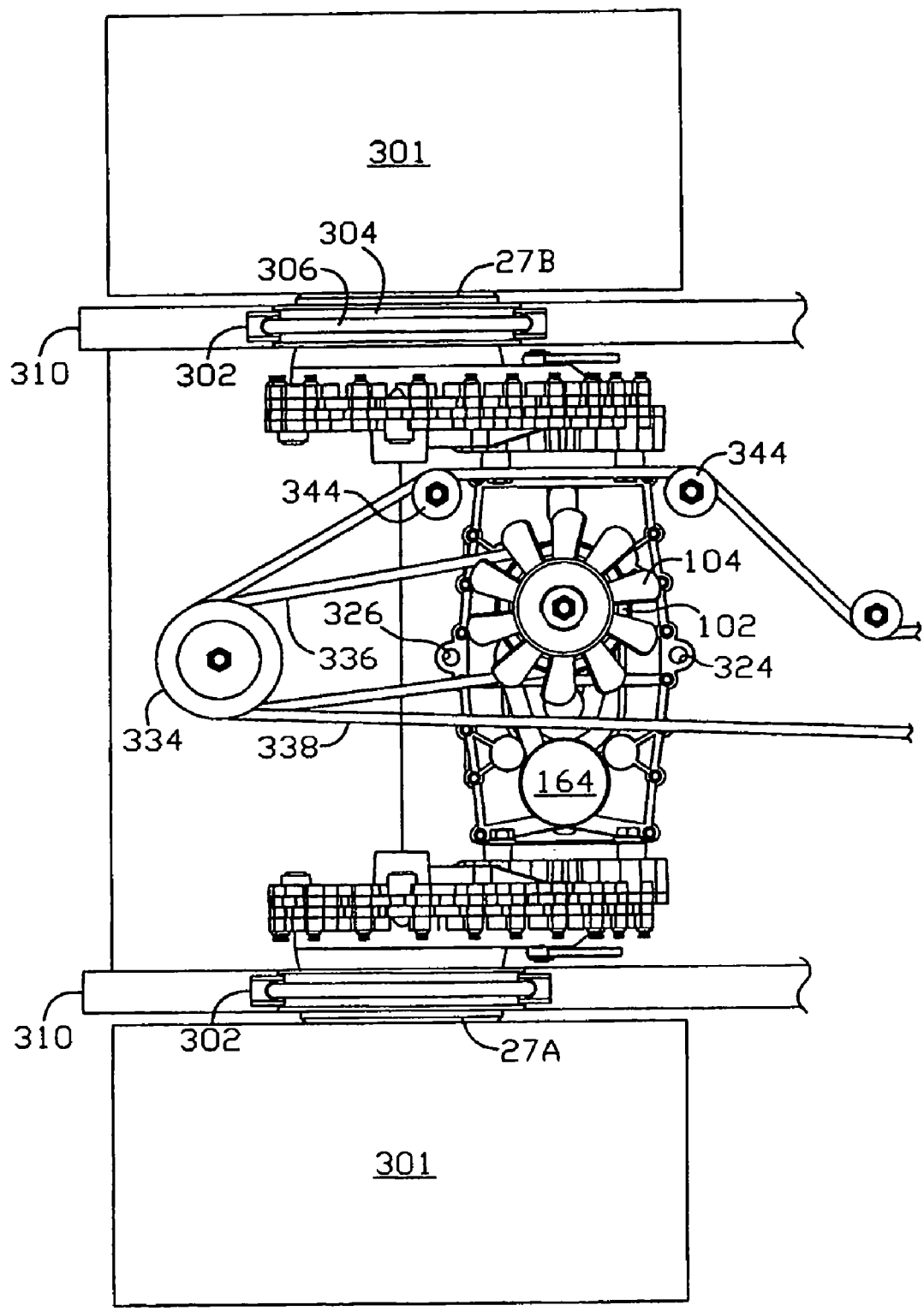
FIG. 23 is a bottom plan view of a portion of the vehicle and transaxle shown in FIG. 22.

One application of the present invention is shown in FIGS. 22 and 23 where a vehicle 300 having a pair of drive wheels 301 is shown. One of the drive wheels is not depicted in FIG. 22 so that the arrangement of the vehicle components can be more clearly shown.

A control handle 316, which may also be a pedal, is mounted to vehicle 300; it will be understood that for zero turn operation there will be two identical such control arms. A control arm 312 is attached to the trunnion arm 132A or 132B and is attached to handle 316 by means of linkage 314.

A mounting bracket 302 is used in conjunction with a rod 306 and a resilient member 304 to mount the transaxle to vehicle frame 310. Resilient member 304 may be a single piece that lies between an axle horn 27 and mounting bracket 302 and portions of rod 306 or it may be a plurality of pieces where one or more pieces are interfaced with mounting bracket 302 and one or more pieces are interfaced with rod 306. Rod 306 is formed in a shape that approximately matches the outer diameter of axle horn 27 with the addition of resilient member 304. The threaded ends of rod 306 are inserted through holes in mounting bracket 302 and then into holes in frame 310. Nuts 308 are used to secure rod 306 and thus secure transaxle 10.

Resilient member 304 may be of a material such as nitrile, selected for appropriate strength, life and dimensional characteristics in the application environment. Resilient member 304 aids in reducing vibrations generated through transaxle 10 and is formed to spread mounting forces between axle horn 27, mounting bracket 302 and rod 306 over a large area to aid in minimizing contact stresses.

In order to resist forces that tend to rotate transaxle 10 during operation, also called torque reaction, holes 324 and 326 are provided in housing 96 and cover 98 to attach transaxle 10 to frame 310.

It should be understood that while these attachment locations are preferably located in housing 96 and cover 98 due to the ease of casting and access during installation, comparable attachment locations may be provided only in housing 96 or one or both axle drive units 22 or 24. Holes 324 and 326 may also be in a variety of other configurations such as blind holes and may be horizontal.

Vehicle 300 includes a prime mover, namely engine 330 having an engine output shaft 332 engaged to a dual pulley 334, which drives both transaxle belt 336 and deck belt 338, which in turn drives deck drive 340. The specifics of the deck drive 340 and deck 342 and similar components of vehicle 300 are not critical to this invention and will not be described in detail herein. As shown most clearly in FIG. 23, a plurality of idler pulleys 344 are used with belt 338. One of the benefits of this design is that it permits deck belt 338 to be located between the two axle drive units 22 and 24.

Figure 1:
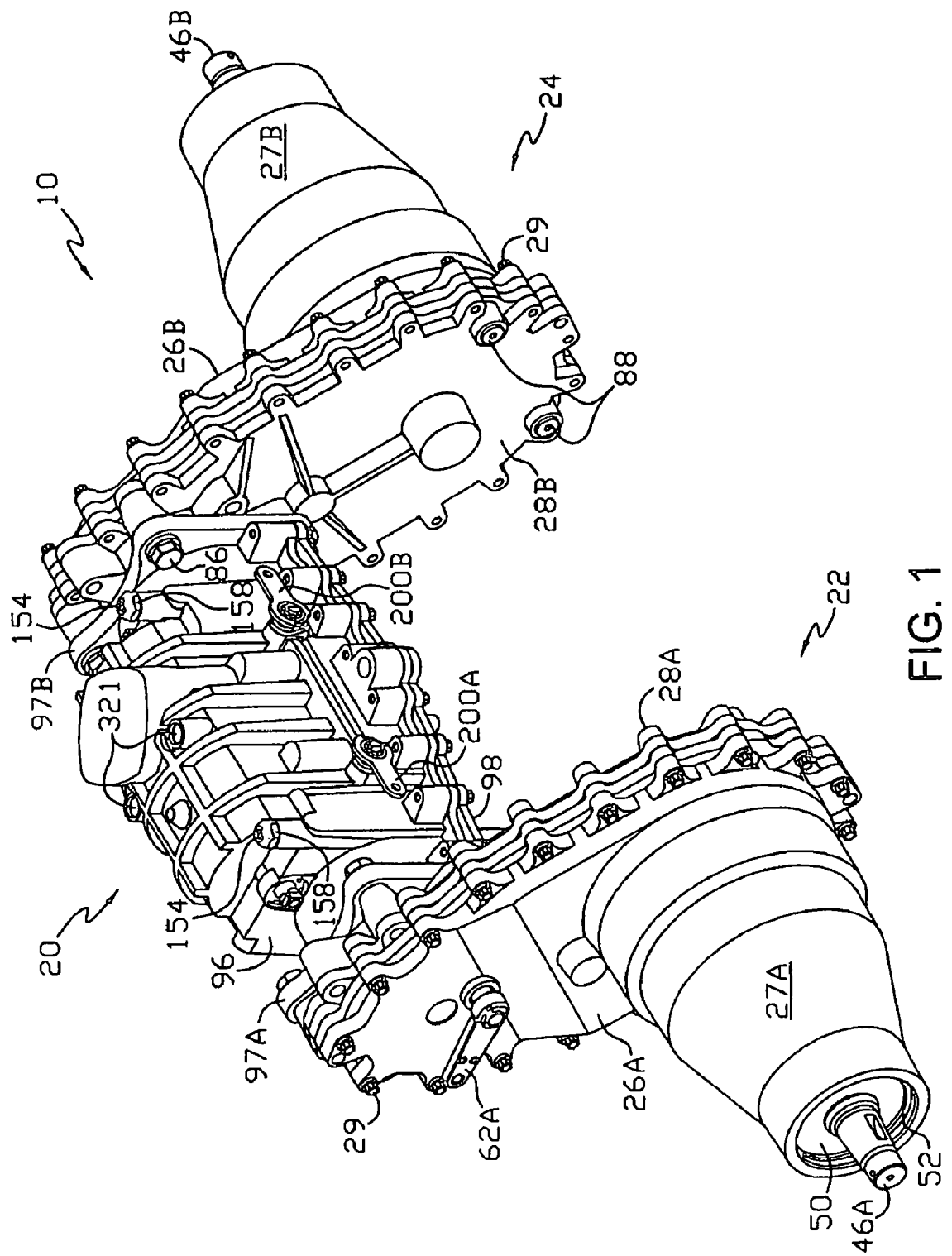
FIG. 1 is a perspective view of a zero turn transaxle in accordance with one embodiment of the invention.
Figure 2:
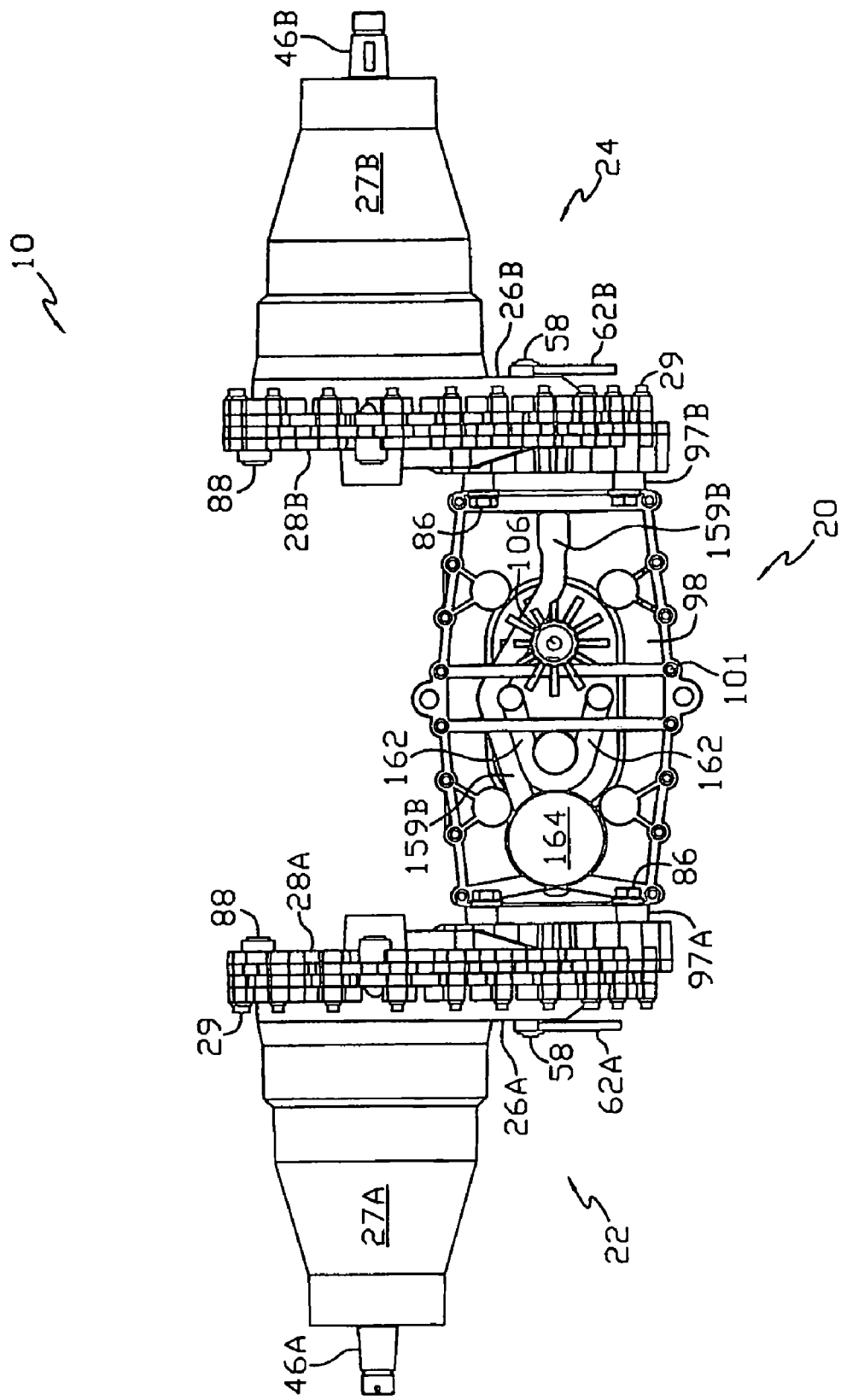
FIG. 2 is a bottom plan view of the transaxle shown in FIG. 1.
Figure 3:
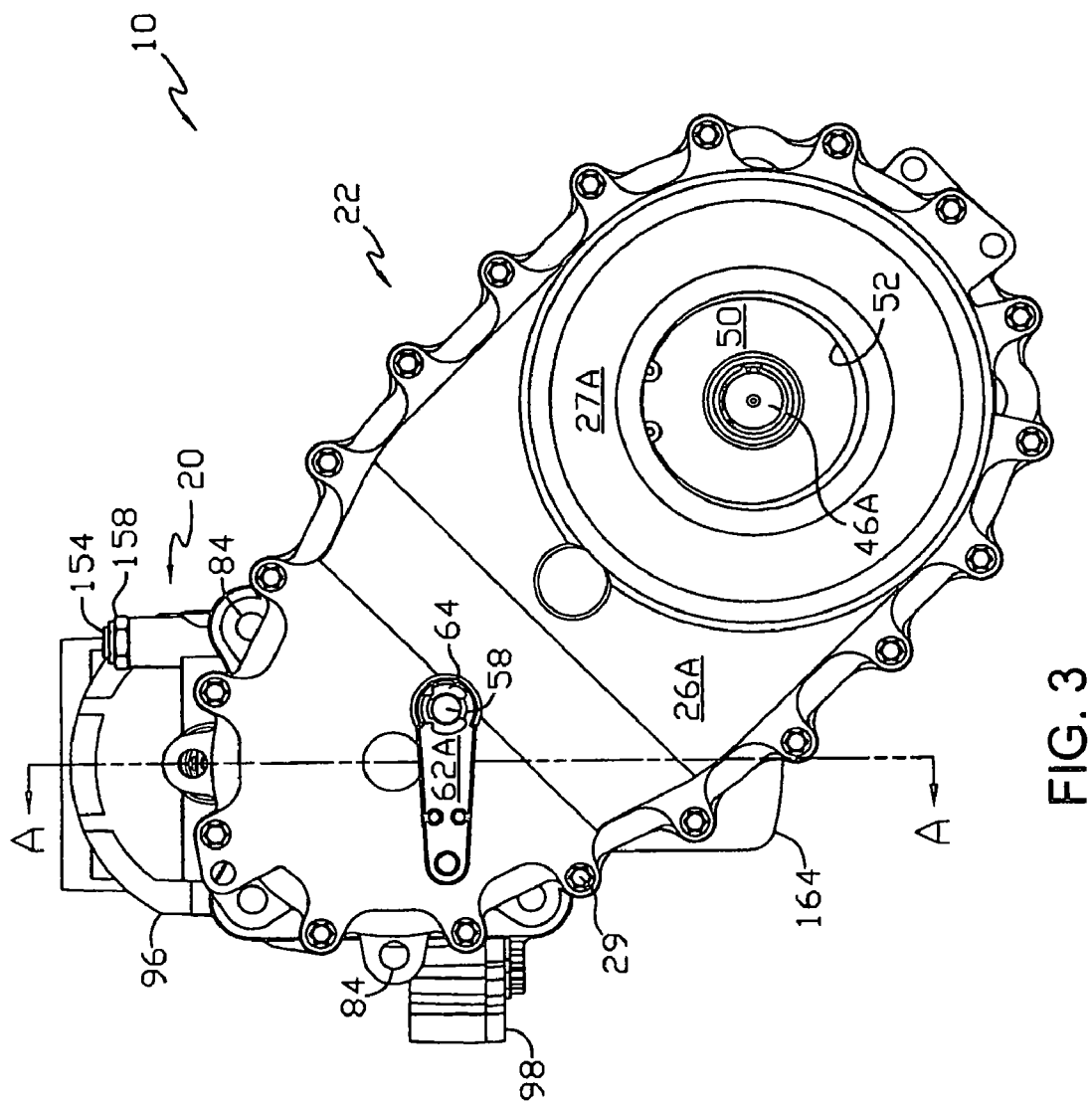
FIG. 3 is an end view of the transaxle shown in FIG. 1.

As has been previously noted, transaxle 10 preferably uses an external expansion tank 320, connected to transaxle 10 at one of ports 321, illustrated in FIG. 1, by means of a tube and various fittings 322. The unused port 321 would be closed by a plug (not shown) or left unfinished and sealed by an aluminum web formed during the casting process as a part of the housing. Also previously noted, the expansion tank 320 may be a variety of internal or external configurations known in the art. Similarly, port 321 may be located in a variety of locations on either or both axle drive units or elsewhere on transmission 20.

It is also intended that this device have an optional internal return to neutral feature 140, as is shown most clearly in FIGS. 9-12, 14, 16, 17 and 20. This feature is similar to that disclosed in co-pending application Ser. No. 10/144,280, also assigned to the assignee of the present invention and incorporated herein by reference.

Figure 10:
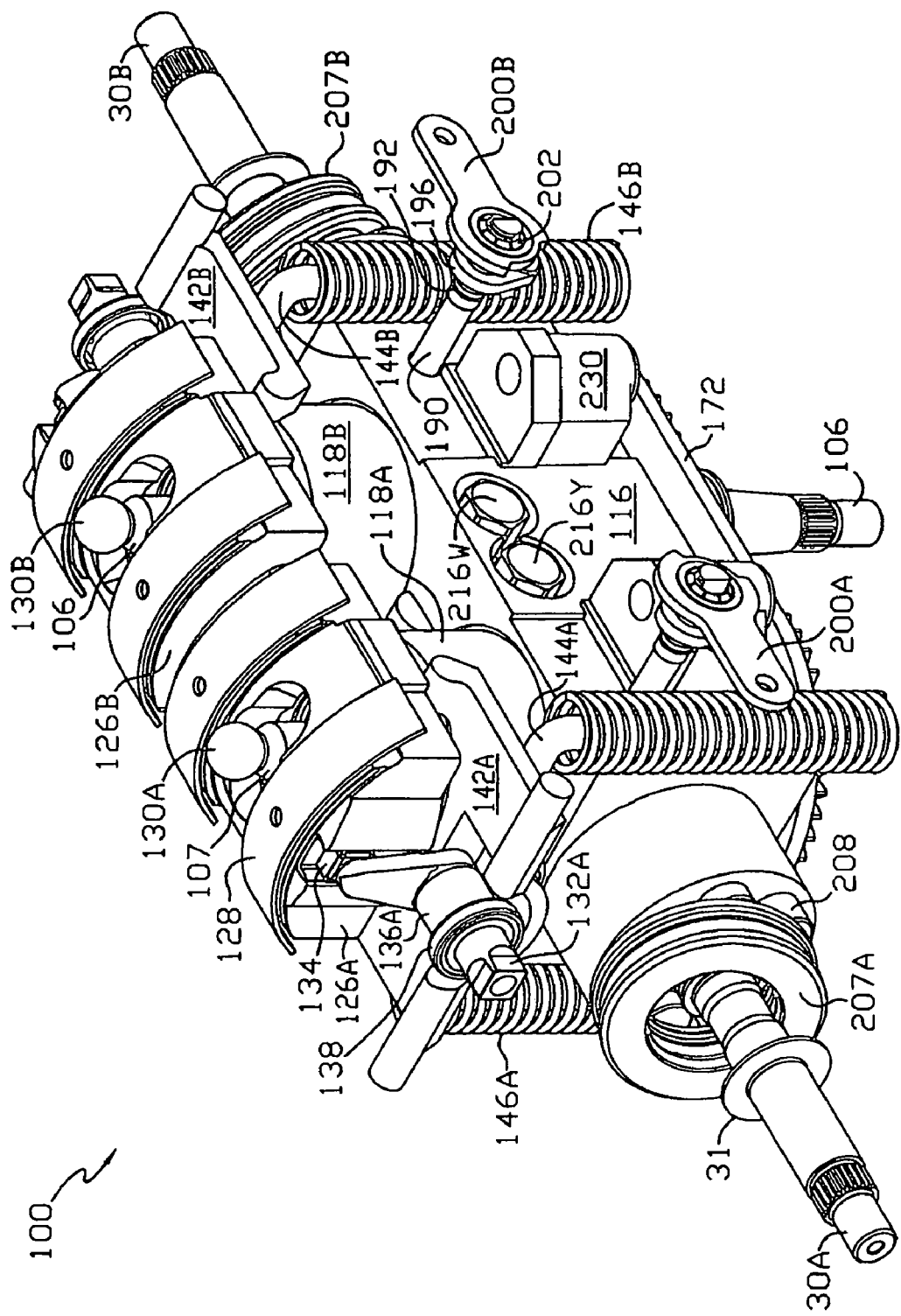
FIG. 10 is a perspective view of the hydrostatic components of the transmission portion of one embodiment of the present invention.
Figure 11:
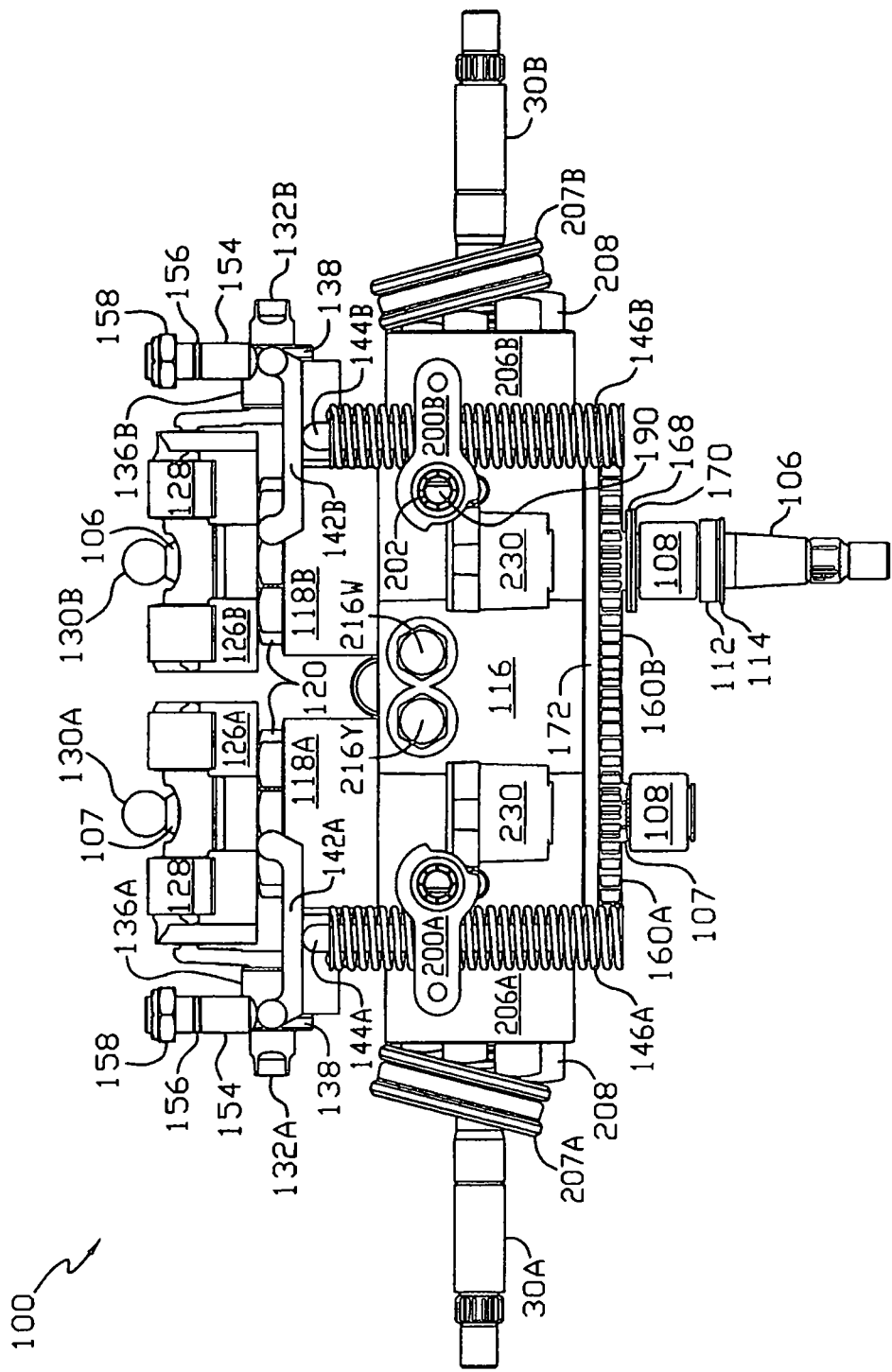
FIG. 11 is a side elevational view of the hydrostatic components shown in FIG. 10.
Figure 12:
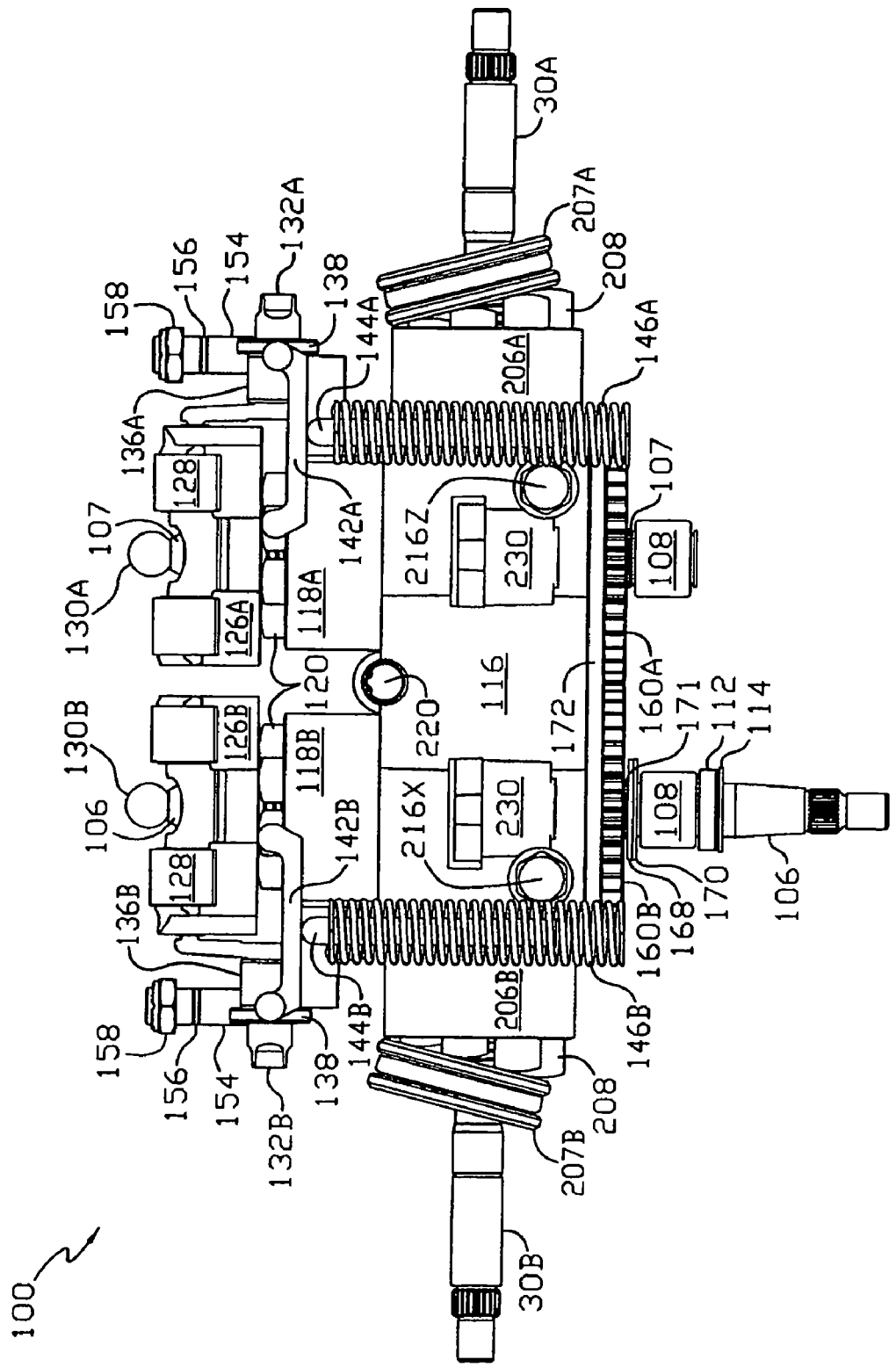
FIG. 12 is a further side elevational view of the hydrostatic components in FIG. 10, from the opposite side as shown in FIG. 11.
Figure 13:
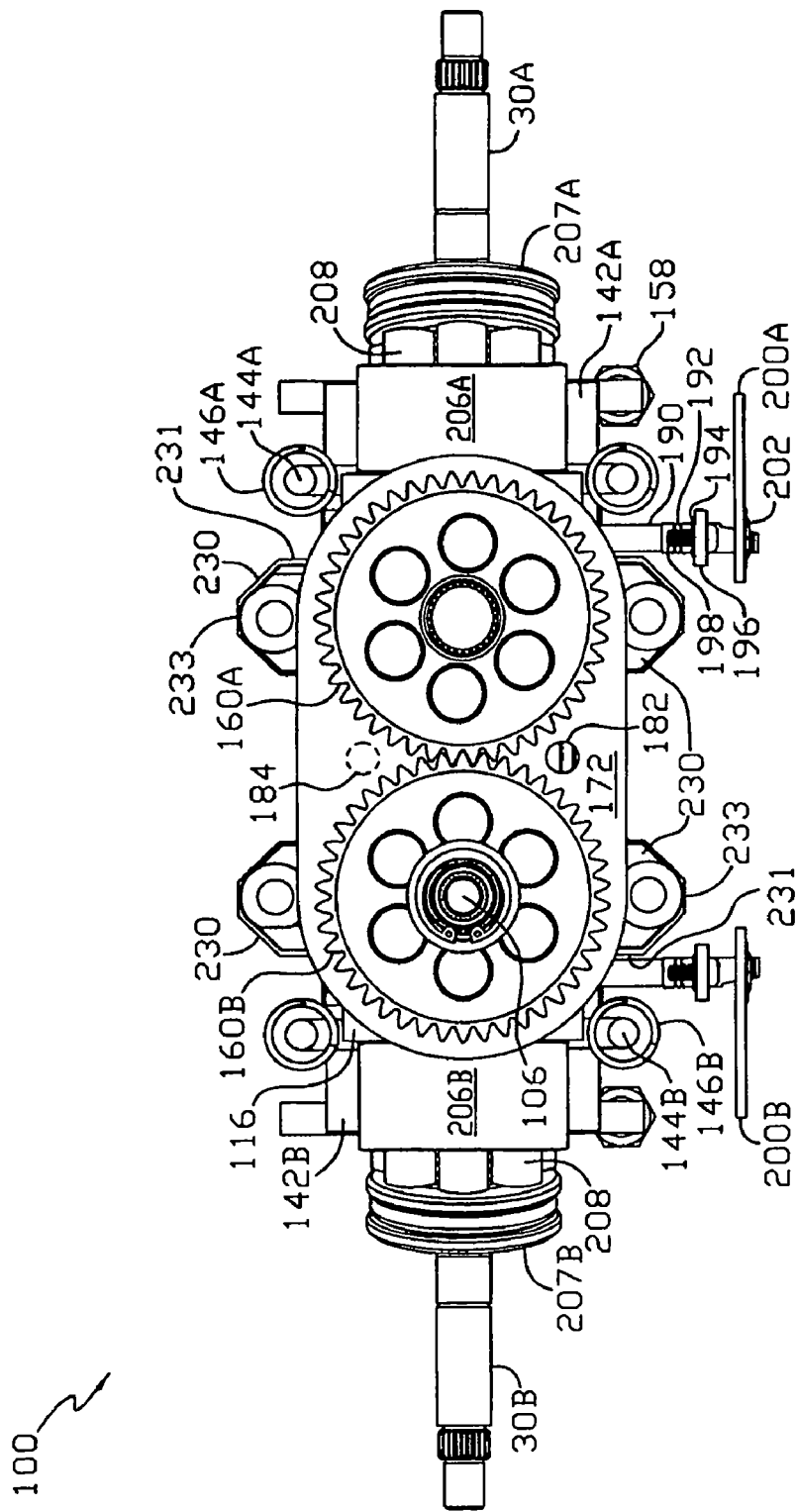
FIG. 13 is a bottom plan view of the hydrostatic components shown in FIG. 10.
Figure 14:
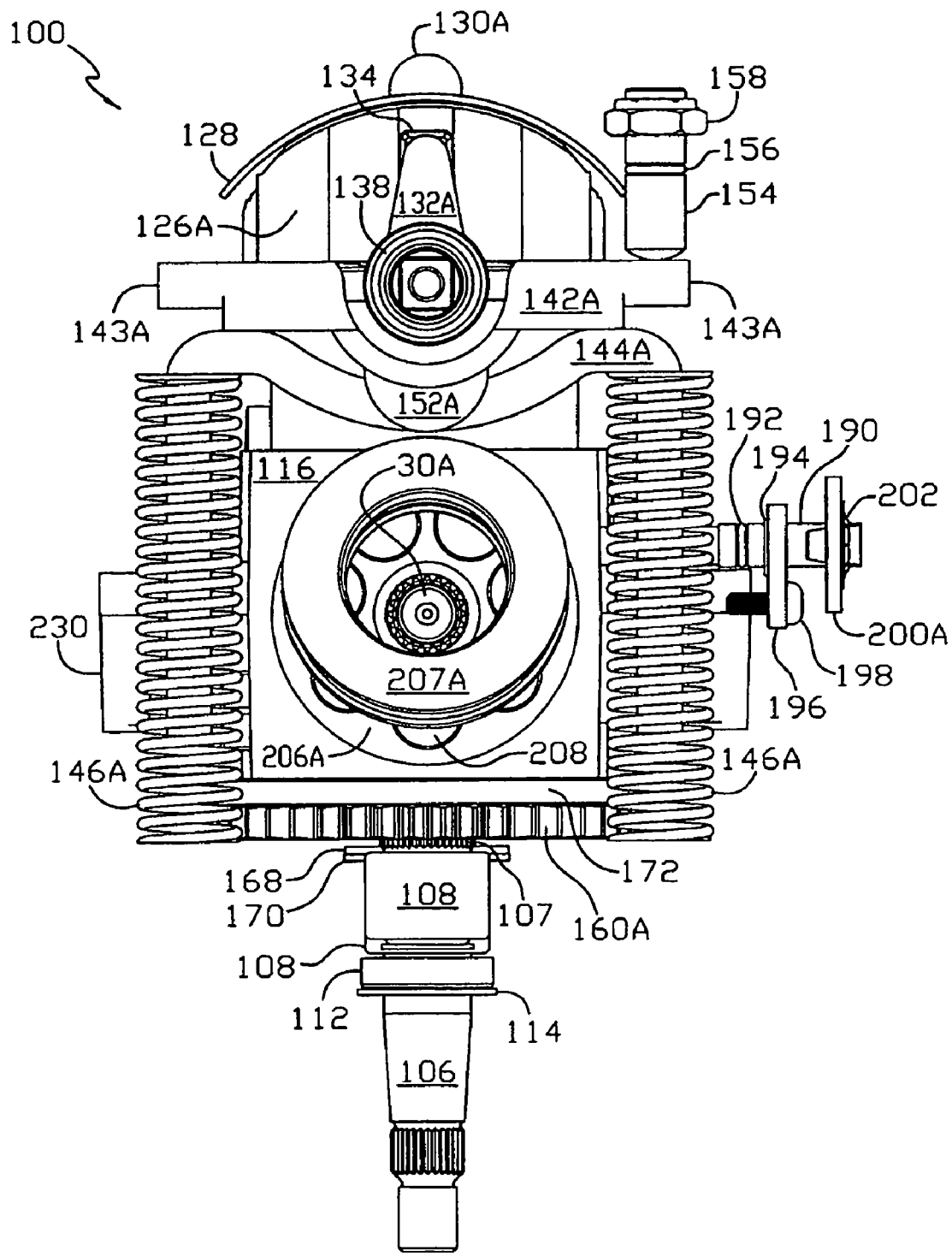
FIG. 14 is an end elevational view of the hydrostatic components shown in FIG. 10.

This feature forces pump swash plates 126A and 126B to the neutral position when the corresponding trunnion arm 132A or 132B is not under stroke. In most cases, this means returning the swash plates 126A or 126B to a generally horizontal position, such as is shown in FIGS. 10 and 14, where there is insufficient axial displacement of the pump pistons 120 to cause rotation of axle shafts 46A or 46B.

The following discussion will focus on the return to neutral feature as applied to swash plate 126A, with the understanding that the corresponding elements on the other side of the unit for swash plate 126B should be identical.

A return plate 142A is mounted in housing 96 and has a pair of oppositely extending pins 143A formed therewith. As shown in FIG. 16, plate 142A can rotate within housing 96 about an axis extending through the two pins 143A. At the opposite end of plate 142A are two projections 145A extending perpendicularly upward from the top surface thereof to contact surface 141 of swash plate 126A.

Plate 142A also has a mating feature 148A comprising a generally curved surface having a pair of lips 152A and 153A extending downwardly therefrom. Arm 144A having a generally circular cross-section is mounted in the housing 96 and comprises a generally U-shaped member having a curved cross-piece 150A that mates with mating feature 148A on plate 142A and is held in place by lips 152A and 153A. Springs 146A are mounted around each end of arm 144A, and are located at one end in holes 149 and act against cover 98. Thus, when swash plate is moved into either the forward or reverse position by movement of trunnion arm 132A, springs 146A will be compressed and will then provide a counteracting spring force in the opposite direction in order to return swash plate 126A to the horizontal or neutral position. Swash plate 126B similarly receives a return force from springs 146B mounted on biasing arm 144B through return plate 142B.

In order to keep bearing arm 144A and its associated springs 146A in position during assembly, a mating feature 147 is provided in housing 96. Feature 147 provides a location for springs 146A to be positioned during installation of cover 98 so that springs 146A may be more easily located in mating holes 149 in cover 98. Springs 146B on the other side are preferably maintained in an identical manner.

A neutral adjust means 154 penetrates housing 96 to contact one pin 143A or 143B of return plate 142A or 142B, respectively, so that the return-to-neutral mechanism may be adjusted to establish a set point to coincide with a neutral position. Neutral adjust means 154 preferably has an o-ring 156 or other means of preventing oil leakage. Neutral adjust means 154 includes a locking device in the form of a nut 158 so that once neutral adjust means 154 is adjusted to an appropriate position, nut 158 may be tightened onto housing 96 to prevent further movement of neutral adjust means 154 that might tend to disassociate the set point of the neutral adjust means from the neutral position of the swash plate.

It is to be understood that the above description of the invention should not be used to limit the invention, as other embodiments and uses of the various features of this invention will be obvious to one skilled in the art. This invention should be read as limited by the scope of its claims only.

What is claimed is:

1. A transaxle comprising:

first and second hydraulic pumps and first and second hydraulic motors disposed within a common transmission housing, wherein the first pump is hydraulically connected to the first motor through a first set of hydraulic porting disposed within the transmission housing and the second pump is hydraulically connected to the second motor through a second set of hydraulic porting disposed within the transmission housing; and a pair of axle drive mechanisms disposed at opposite ends of the transmission housing, each axle drive mechanism comprising:

a gear housing having a first section secured to an end of the transmission housing and a second section offset from the transmission housing;

a gear train disposed in the gear housing and extending from the first section to the second section; and an axle shaft driven by the gear train and extending from the gear housing, wherein each axle shaft has a longitudinal axis of rotation which does not intersect any portion of the transmission housing.

2. The transaxle of claim 1, further comprising:

a first axle horn mounted on a side surface of the first gear housing, wherein a portion of the first axle shaft is disposed within the first axle horn; and a second axle horn mounted on a side surface of the second gear housing, wherein a portion of the second axle shaft is disposed within the second axle horn.

3. The transaxle of claim 1, further comprising a common center section disposed within the transmission housing, wherein the first and second pumps and first and second motors are rotatably disposed on running surfaces on the center section, and the first and second sets of hydraulic porting are formed within the center section.

4. The transaxle of claim 3, wherein each hydraulic pump comprises a rotatable pump cylinder block and an input shaft drivingly engaged to the pump cylinder block, and the two input shafts are disposed at least partially within the transmission housing and parallel to one another, and each hydraulic motor comprises a rotatable motor cylinder block and a motor shaft engaged to and driven by the motor cylinder block, and the two motor shafts are disposed perpendicular to the two input shafts.

5. The transaxle of claim 4, wherein each motor shaft extends out one end of the transmission housing and into one of the gear housings to drive one of the gear trains.

6. The transaxle of claim 5, further comprising a pair of axle horns, each axle horn mounted on a side surface of one of the gear housings and wherein a portion of each axle shaft is disposed within one of the axle horns.

7. The transaxle of claim 1, wherein the axes of rotation of the two axle shafts are collinear.

8. A transaxle for use on a vehicle having a prime mover driving a belt drive system, the transaxle comprising:

(a) a transmission housing forming an internal sump, the transmission housing comprising a top surface, a bottom surface, two opposing end surfaces and two opposing side surfaces;

(b) a hydrostatic transmission disposed within the transmission housing, the hydrostatic transmission comprising a pair of hydraulic motors, a pair of hydraulic pumps, each pump being connected to one of the motors through a separate hydraulic circuit, and an input drive shaft extending through the bottom surface of the transmission housing;

(c) a pair of gear drives secured to opposite ends of the transmission housing, each gear drive comprising a gear housing having a first side surface, wherein a portion of the first side surface is secured to one end of the transmission housing, and a second side surface opposite the first side surface, a gear train disposed within the gear housing, and an axle shaft driven by the gear train and extending out the second side surface of the gear housing, each gear housing comprising a section extending downwardly from the transmission housing, wherein the longitudinal axes of the two axle shafts and do not intersect any portion of the transmission housing;

(d) a belt receiving area at least partially defined by the bottom surface of the transmission housing and the first side surfaces of the two gear housings for receiving at least a portion of the belt drive system, wherein one end of the input drive shaft extends into the belt receiving area and a pulley is mounted on the one end of the input drive shaft to engage the belt drive system.

9. The transaxle of claim 8, wherein the transmission housing further comprises a main housing member forming the top, end and side surfaces of the transmission housing and a cover plate secured to the main housing member to form the bottom surface of the transmission housing.

10. The transaxle of claim 9, further comprising axle horns disposed on the second side surface of each gear housing, wherein a portion of each axle shaft is disposed within one of the axle horns.

11. The transaxle of claim 8, wherein each pump comprises a rotatable cylinder block and the input drive shaft directly engages one of the pump cylinder blocks and drives a separate pump shaft for the other pump cylinder block through a pump gear train.

12. The transaxle of claim 8, wherein the axes of rotation of the two axle shafts are collinear.

13. The transaxle of claim 12, wherein the two axle shafts are disposed directly below the bottom surface of the common transmission housing.

14. A transaxle comprising:

(a) a transmission housing forming an internal sump, the transmission housing comprising a top surface, a bottom surface, two opposing end surfaces and two opposing side surfaces;

(b) a hydrostatic transmission disposed within the transmission housing, the hydrostatic transmission comprising a pair of hydraulic motors, a pair of motor output shafts, each output shaft engaged to and driven by one of the motors, and a pair of hydraulic pumps, each pump being connected to one of the motors through a separate hydraulic circuit, (c) a pair of axle drive mechanisms disposed at opposite ends of the transmission housing, each axle drive comprising a gear housing having a first wall section secured to an end of the transmission housing and a second wall section opposite from the first wall section, a gear train disposed in the gear housing; and an axle shaft driven by the gear train and extending from the second wall section; and (d) a functional space defined at least in part by the bottom surface of the transmission housing and the two first wall sections of the two gear housings, wherein the longitudinal axes of rotation of the two axle shafts each extend through the functional space.

15. The transaxle of claim 14, wherein the two axle shafts have collinear axes of rotation.

16. The transaxle of claim 15, wherein the two axle shafts are disposed directly below the bottom surface of the common transmission housing.

17. The transaxle of claim 15, wherein the two axle shafts are offset from the bottom surface of the common transmission housing.

18. The transaxle of claim 14, further comprising an input drive shaft extending through the bottom surface of the transmission housing and having a pulley disposed on an end of the input drive shaft to operatively connect the hydrostatic transmission to a prime mover.

19. The transaxle of claim 18, wherein the pulley is engaged to a belt drive disposed at least in part in the functional space.

20. The transaxle of claim 18, wherein the input drive shaft is engaged to and directly drives one of the hydraulic pumps and is engaged to and drives the other hydraulic pump through a gear drive.

21. The transaxle of claim 14, wherein one of the motor output shafts extends out of one of the opposing end surfaces of the transmission housing and through the first wall section of one of the gear housings and the other motor output shaft extends out of the other opposing end surface of the transmission housing and through the first wall section of the other gear housing.

* * * * *